(12) United States Patent
Shibata et al.

(10) Patent No.: US 8,272,569 B2
(45) Date of Patent: *Sep. 25, 2012

(54) APPARATUS FOR COMMUNICATING WITH RFID TAG

(75) Inventors: Tomoaki Shibata, Nagoya (JP); Yasuhisa Ichikawa, Nagoya (JP); Katsumi Toda, Toyota (JP)

(73) Assignee: Brother Kogyo Kabushiki Kaisha, Nagoya-Shi, Aichi (JP)

(*) Notice: Subject to any disclaimer, the term of this patent is extended or adjusted under 35 U.S.C. 154(b) by 272 days.

This patent is subject to a terminal disclaimer.

(21) Appl. No.: 12/455,777

(22) Filed: Jun. 5, 2009

(65) Prior Publication Data

US 2009/0266895 A1 Oct. 29, 2009

Related U.S. Application Data

(63) Continuation-in-part of application No. PCT/JP2007/073782, filed on Dec. 10, 2007.

(30) Foreign Application Priority Data

Dec. 11, 2006 (JP) ................................. 2006-333427

(51) Int. Cl.
*G06K 7/08* (2006.01)
*G08B 13/14* (2006.01)

(52) U.S. Cl. ..................................... 235/451; 340/572.1

(58) Field of Classification Search .................. 235/451, 235/475–477; 340/572.1, 572.4, 572.7, 572.8, 340/10.1, 10.51; 400/61, 70; 101/35

See application file for complete search history.

(56) References Cited

U.S. PATENT DOCUMENTS

| | | | | |
|---|---|---|---|---|
| 6,246,326 B1* | 6/2001 | Wiklof et al. | ............... | 340/572.1 |
| 7,876,223 B2* | 1/2011 | Yamaguchi et al. | ........ | 340/572.1 |
| 7,928,848 B2* | 4/2011 | Moriyama | ................. | 340/572.8 |
| 8,038,069 B2* | 10/2011 | Nagai et al. | .................... | 235/492 |
| 2007/0014615 A1* | 1/2007 | Kasayama et al. | .............. | 400/76 |
| 2007/0120670 A1* | 5/2007 | Torchalski | ................. | 340/572.1 |
| 2007/0262864 A1* | 11/2007 | Yasui et al. | ................ | 340/572.1 |

FOREIGN PATENT DOCUMENTS

| | | |
|---|---|---|
| EP | 1643413 | 4/2006 |
| EP | 1701294 | 9/2006 |
| JP | 2001291081 A | 10/2001 |
| JP | 2003132330 | 9/2003 |
| JP | 2005186567 | 7/2005 |
| JP | 2005196236 A | 7/2005 |
| JP | 2005298100 | 10/2005 |
| JP | 2006056225 A | 3/2006 |

* cited by examiner

*Primary Examiner* — Michael G Lee
*Assistant Examiner* — Suezu Ellis
(74) *Attorney, Agent, or Firm* — McCarter & English, LLP

(57) ABSTRACT

An apparatus for communicating with a radio frequency identification (RFID) tag with a feeding device configured to feed a tag medium; an antenna for label production and an antenna for information acquisition that can respectively transmit or receive information to a RFID circuit element for label production or for information acquisition; an antenna switching control portion configured to switch so as to selectively transmit an inquiry signal to the RFID circuit element for label production or for information acquisition; and a mode processing portion configured to carry out processing corresponding to a communication processing mode or an information acquisition processing mode.

11 Claims, 18 Drawing Sheets

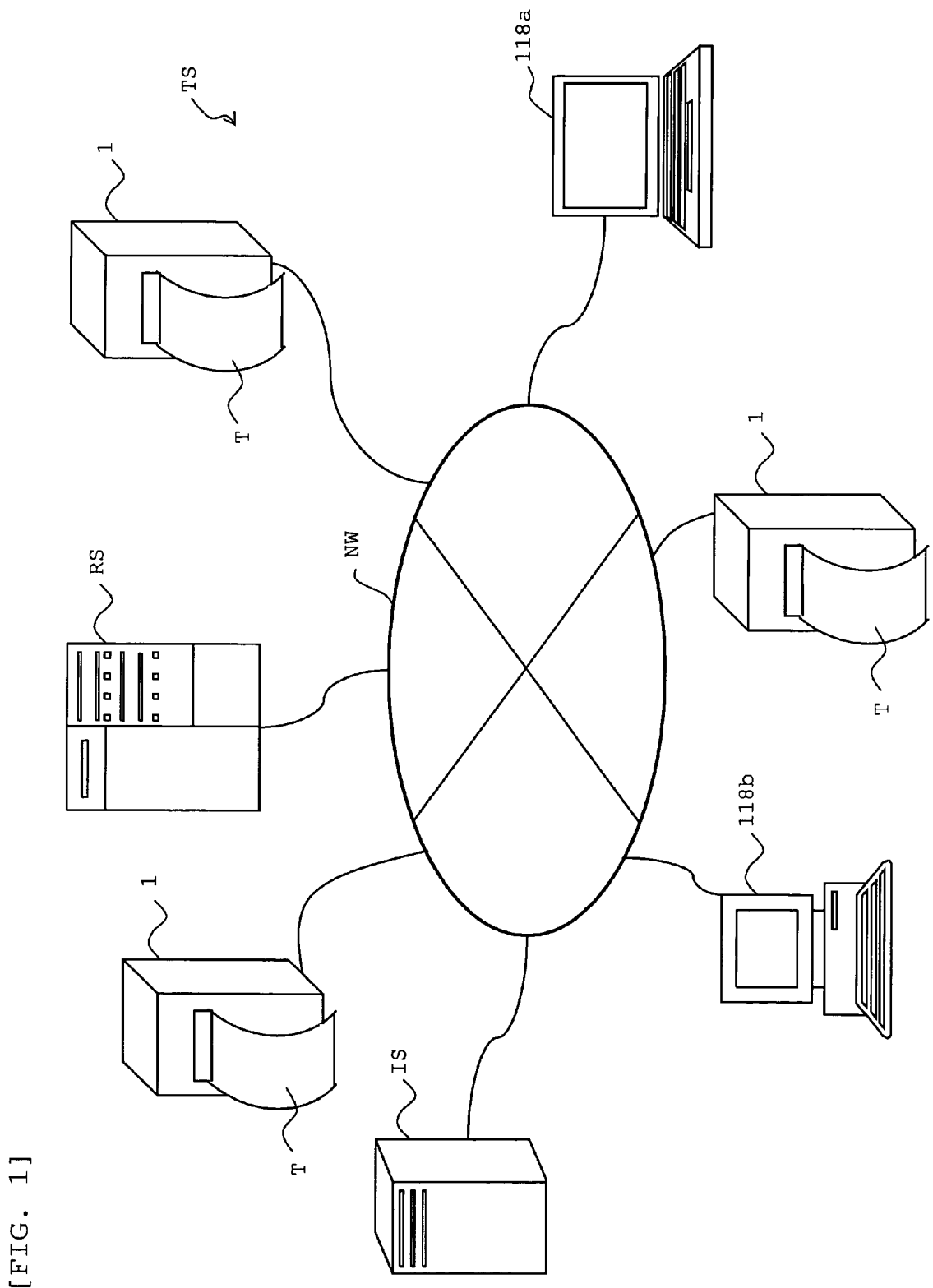
[FIG. 1]

[FIG. 2]
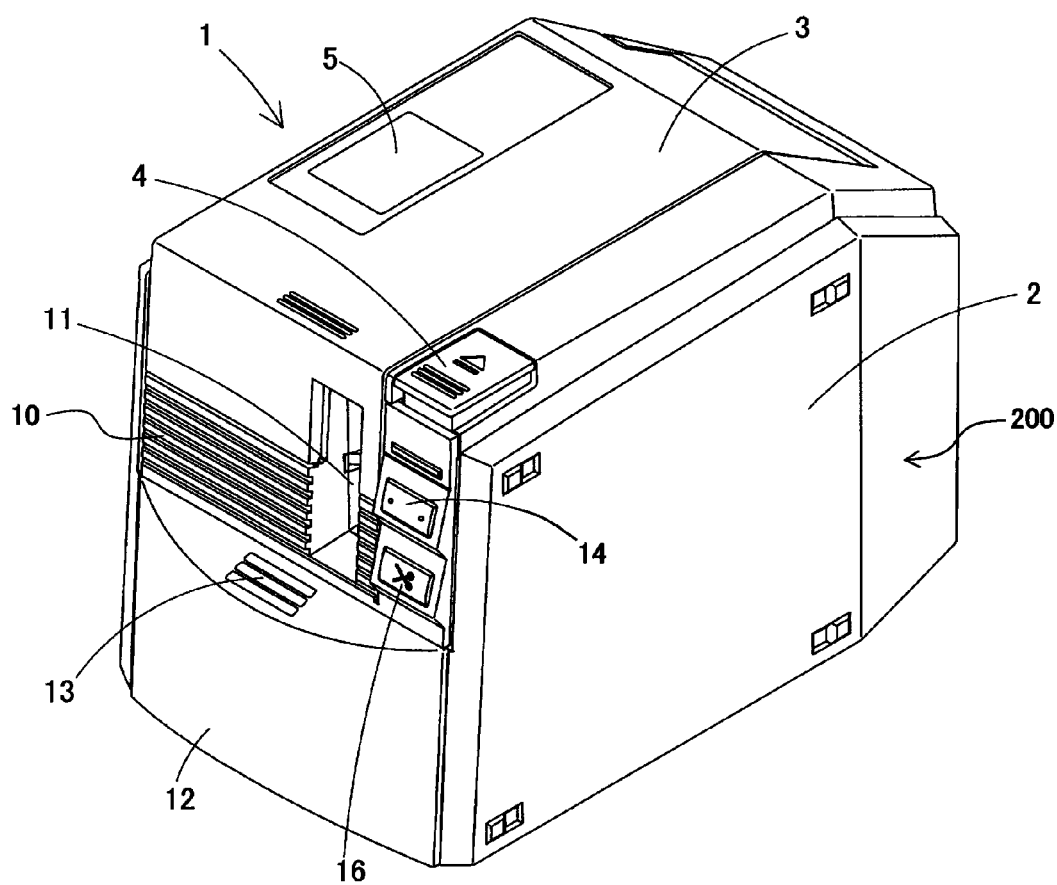

[FIG. 3]
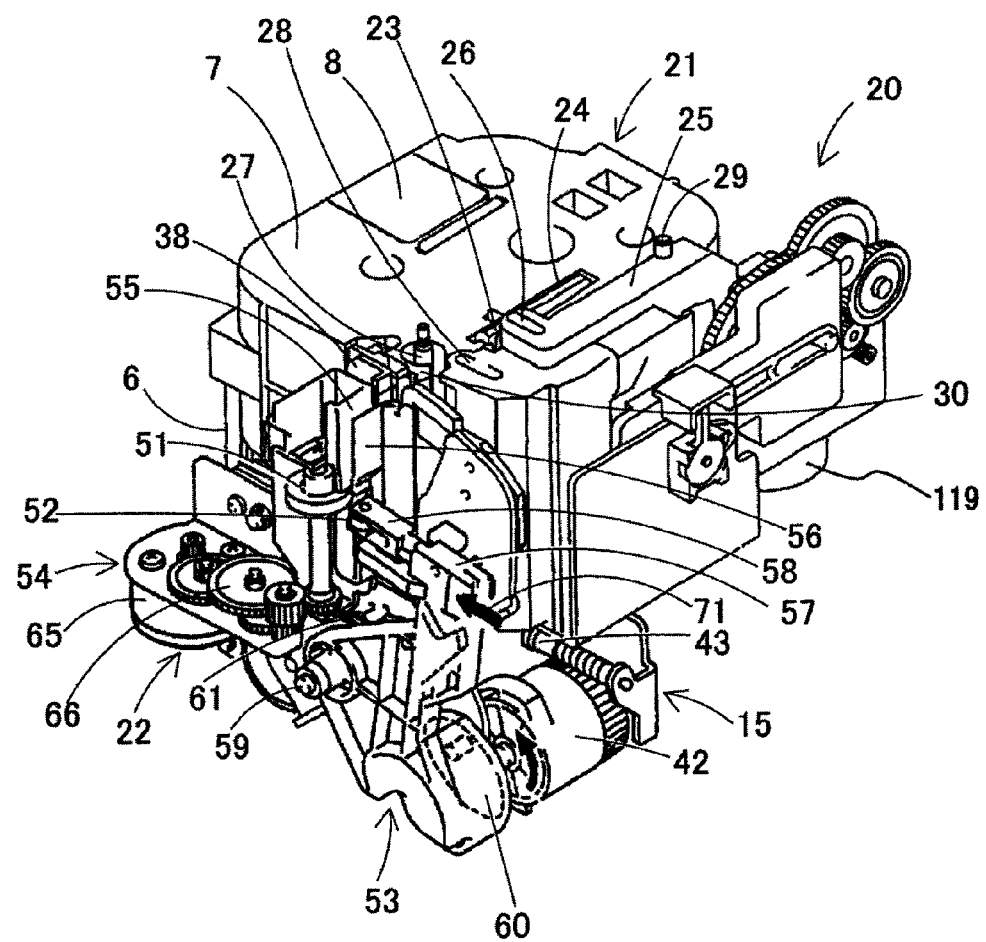

[FIG. 4]
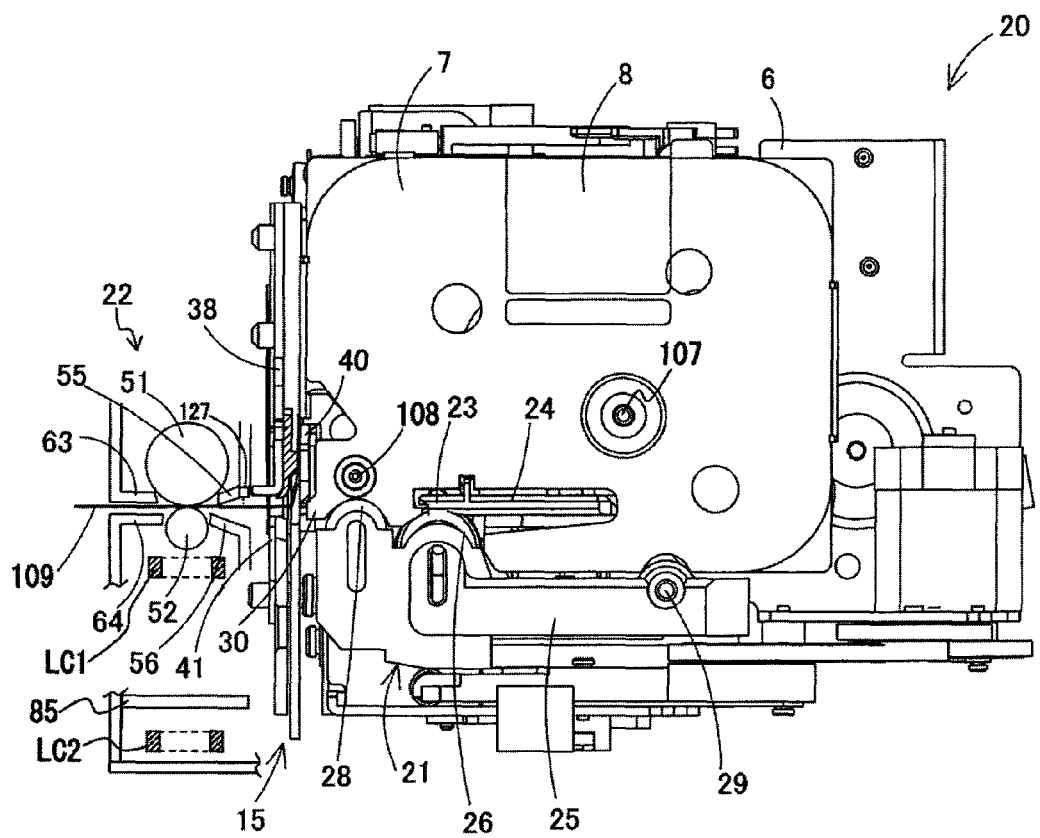

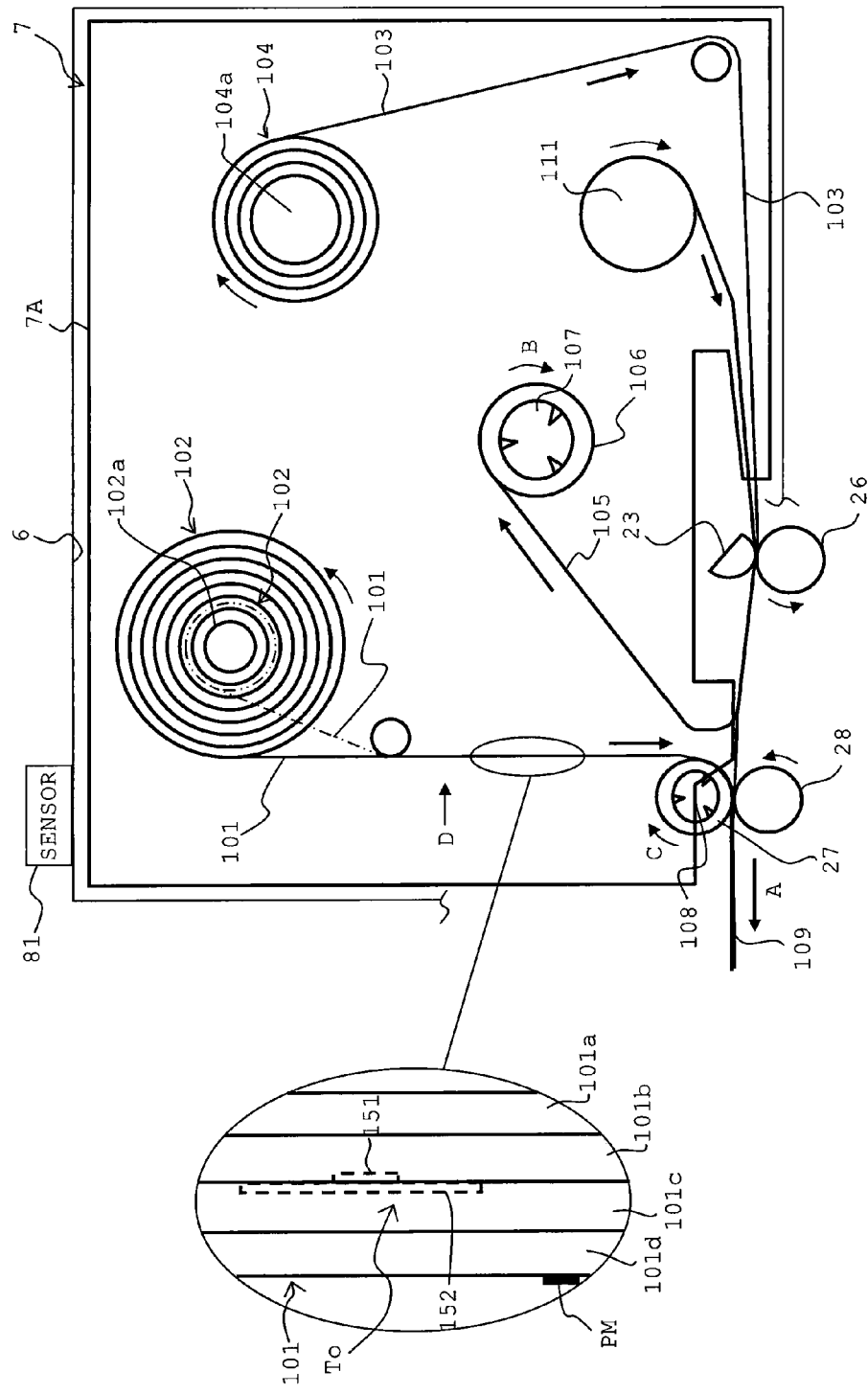

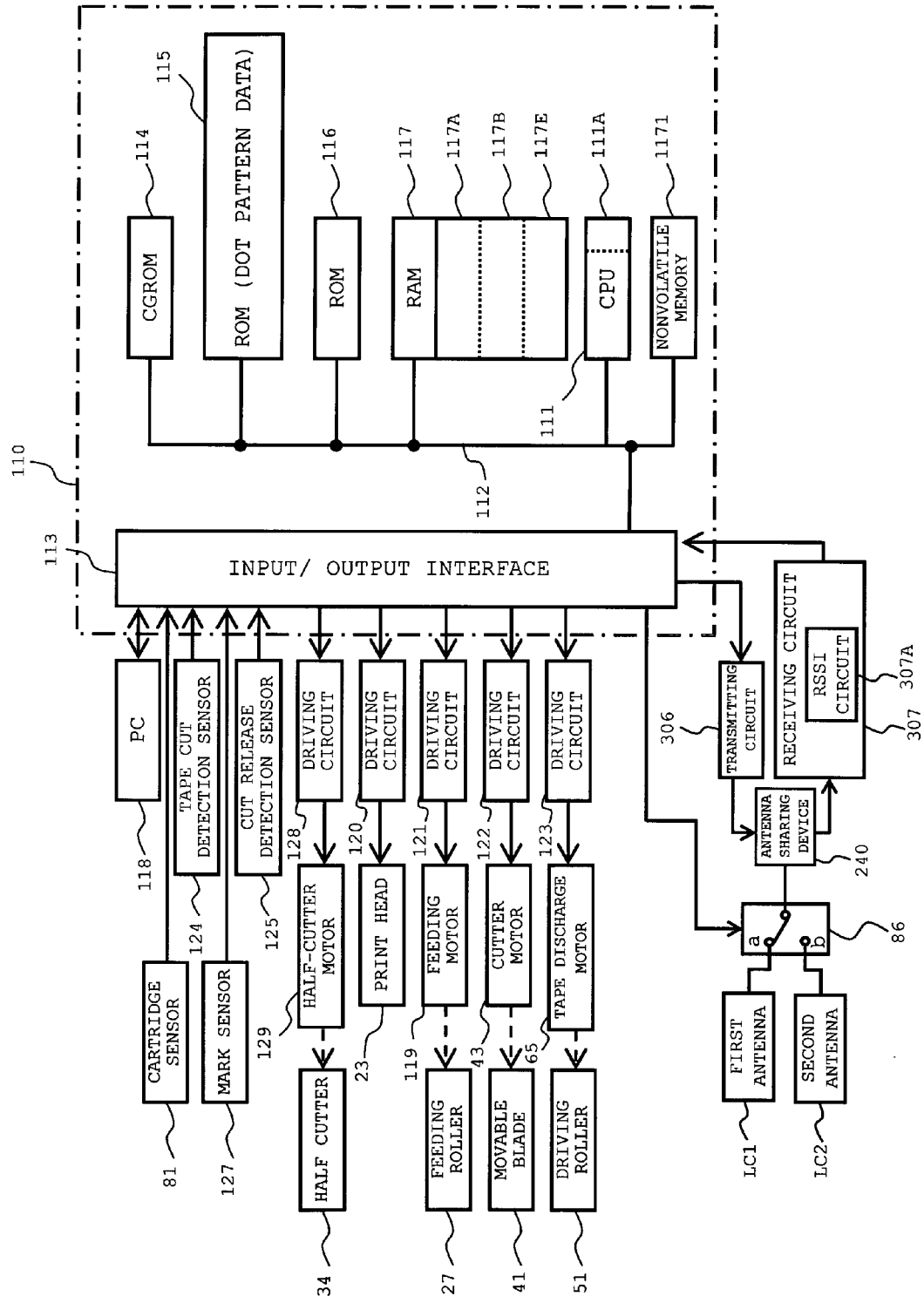
[FIG. 6]

[FIG. 7]
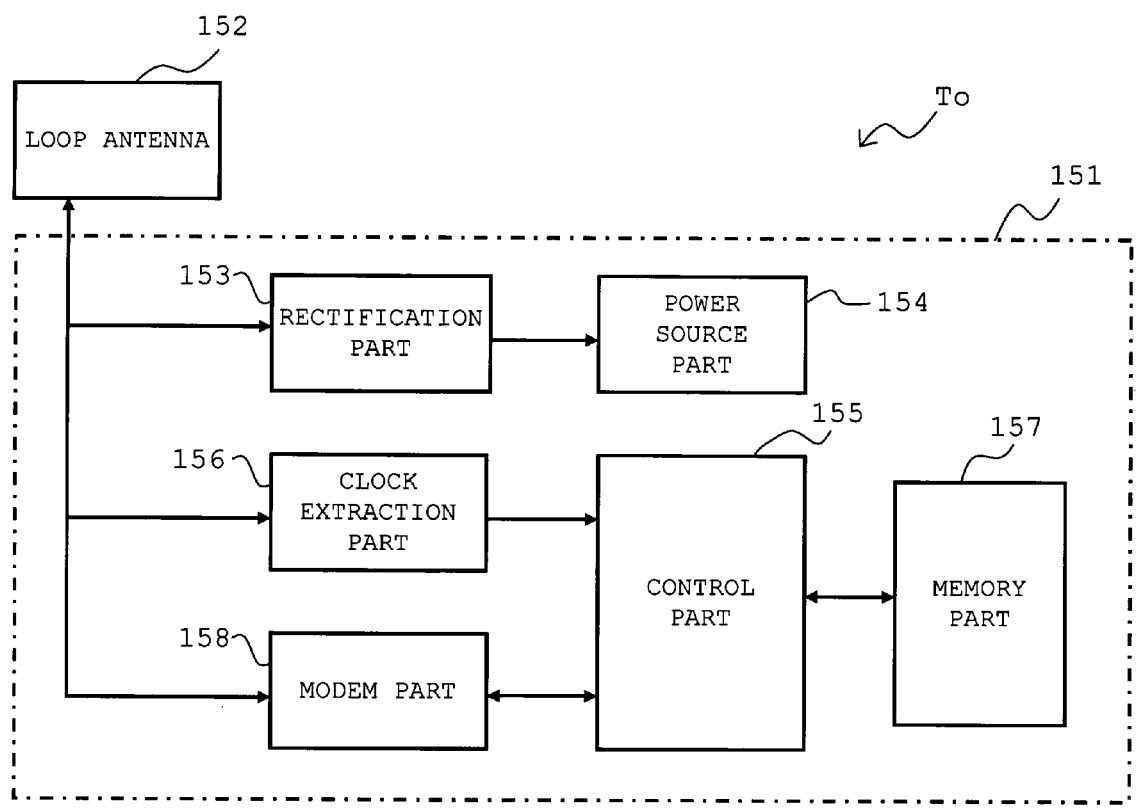

[FIG. 8A]
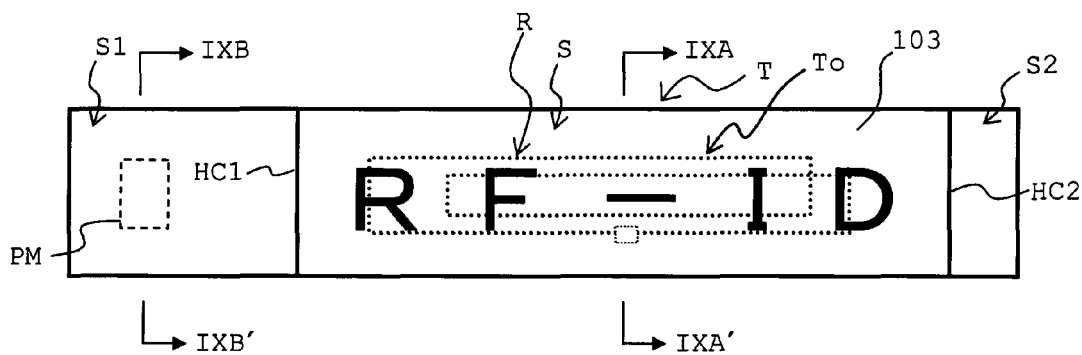
[FIG. 8B]
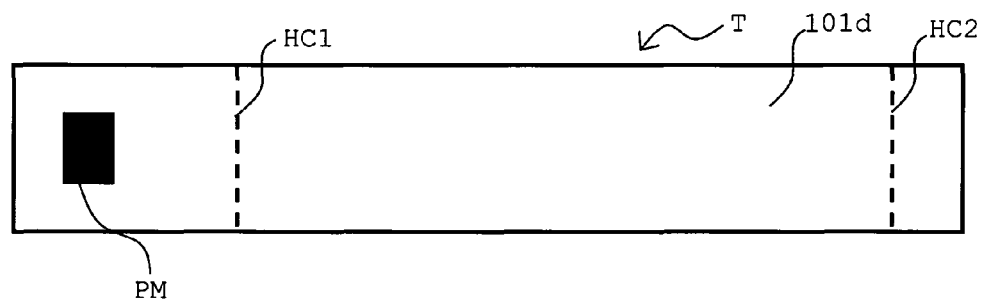

[FIG. 9A]
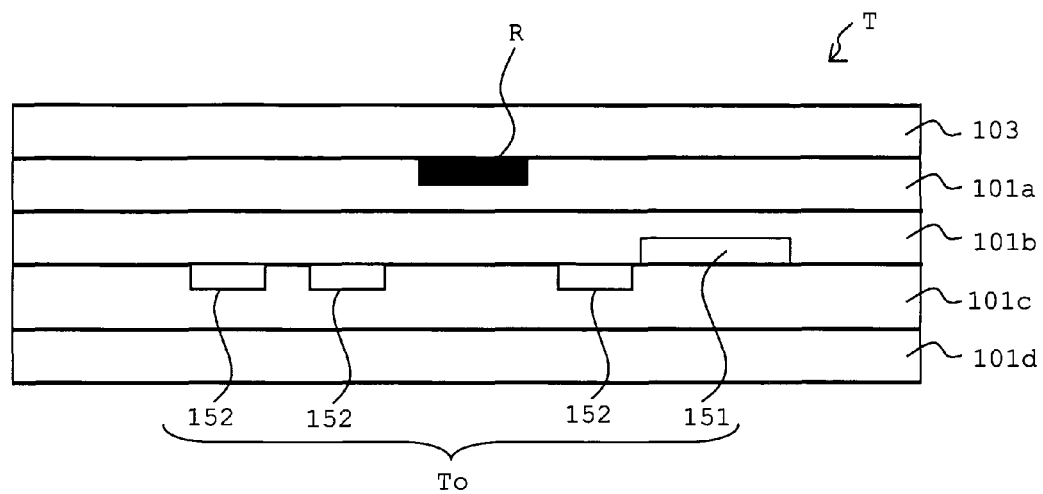
[FIG. 9B]
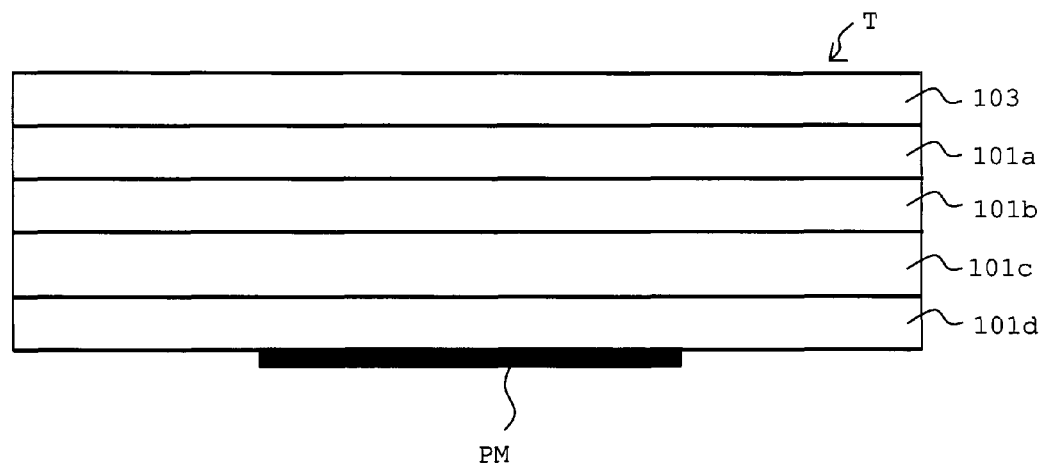

[FIG. 10A]
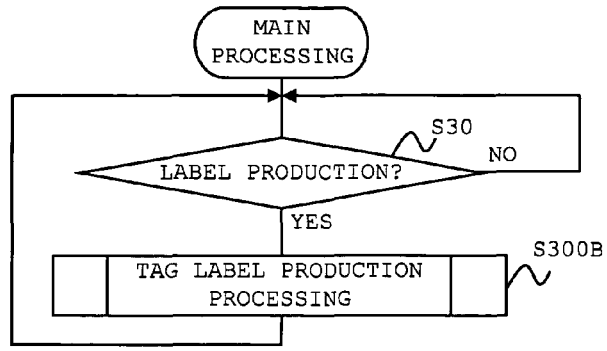
[FIG. 10B]
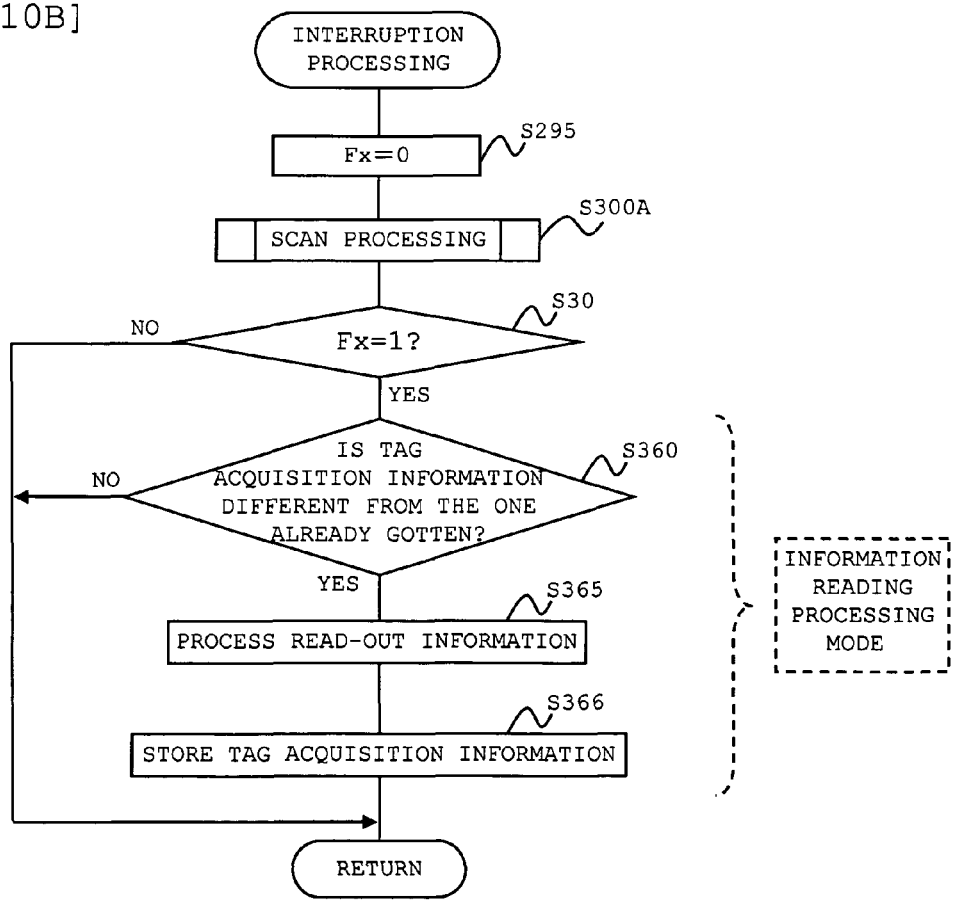

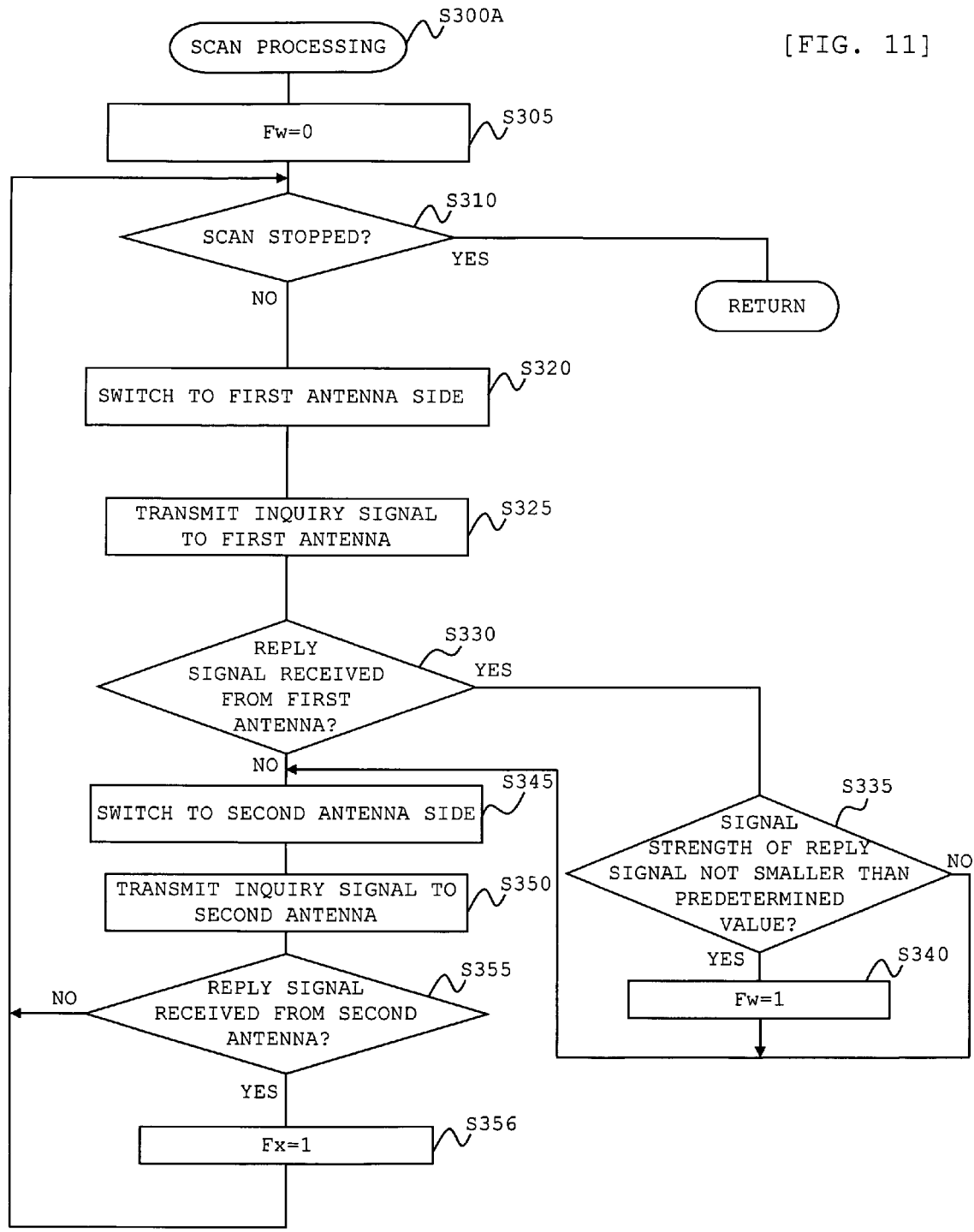
[FIG. 11]

[FIG. 12]
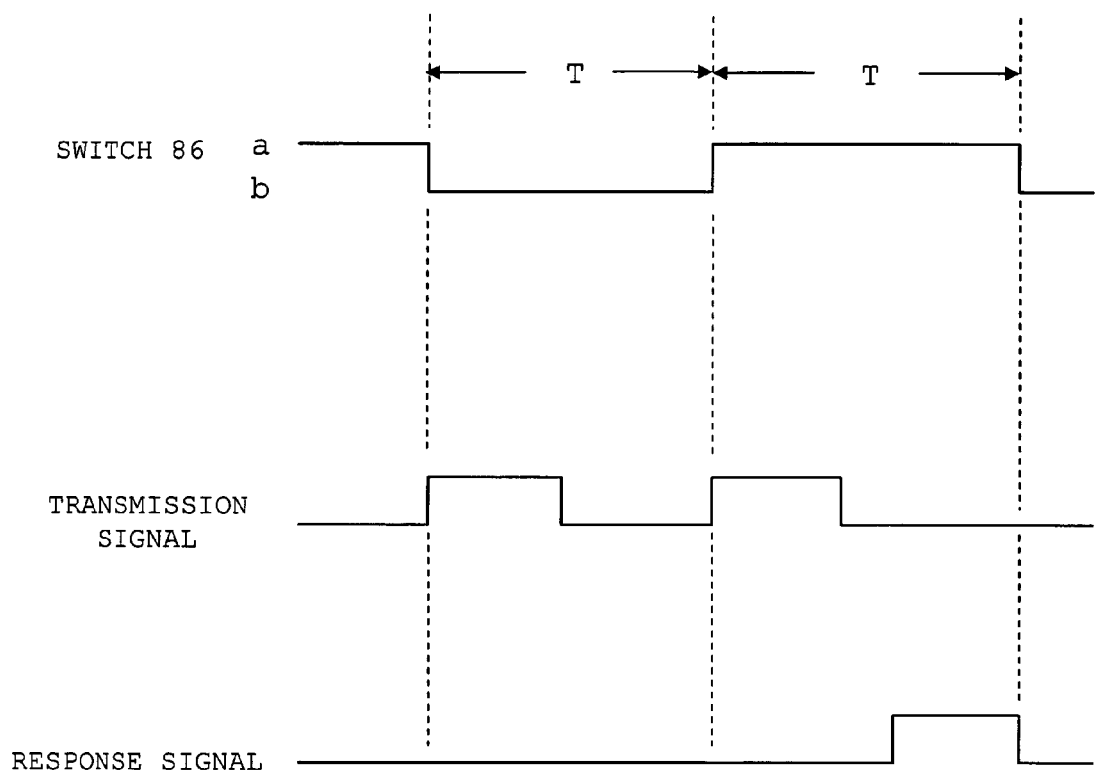

[FIG. 13]
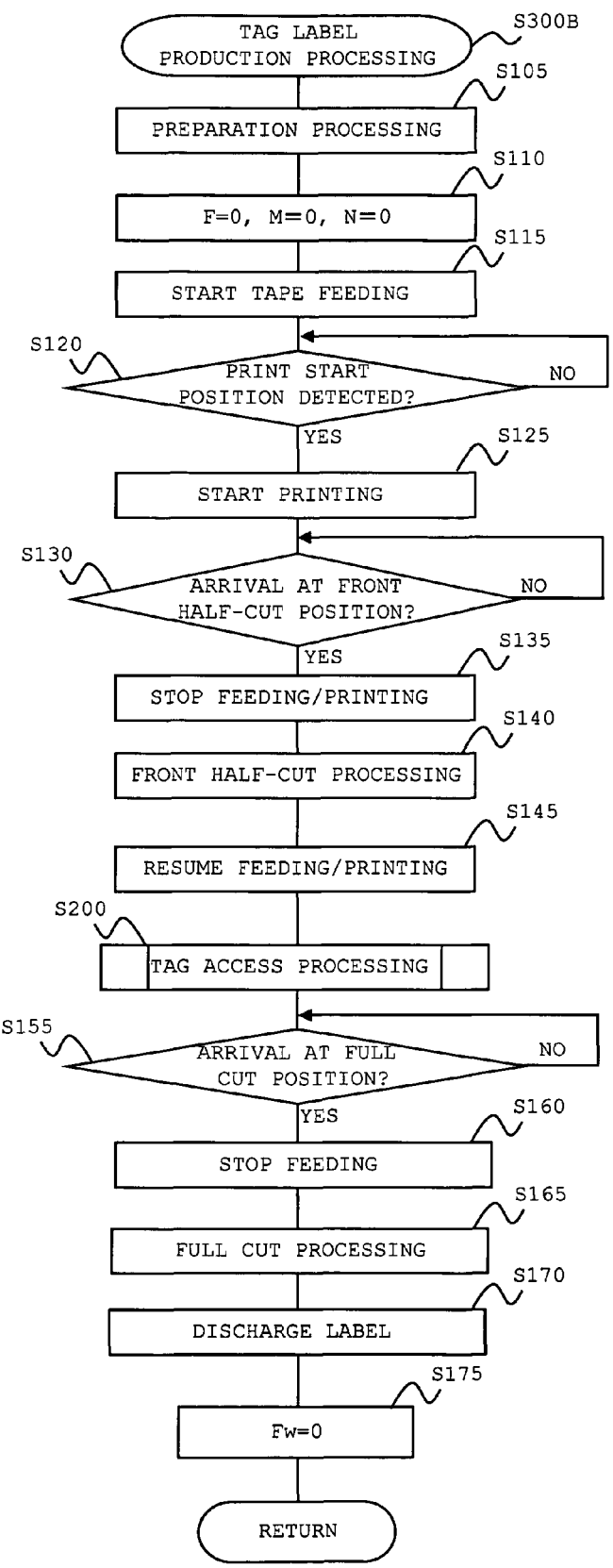

[FIG. 14]
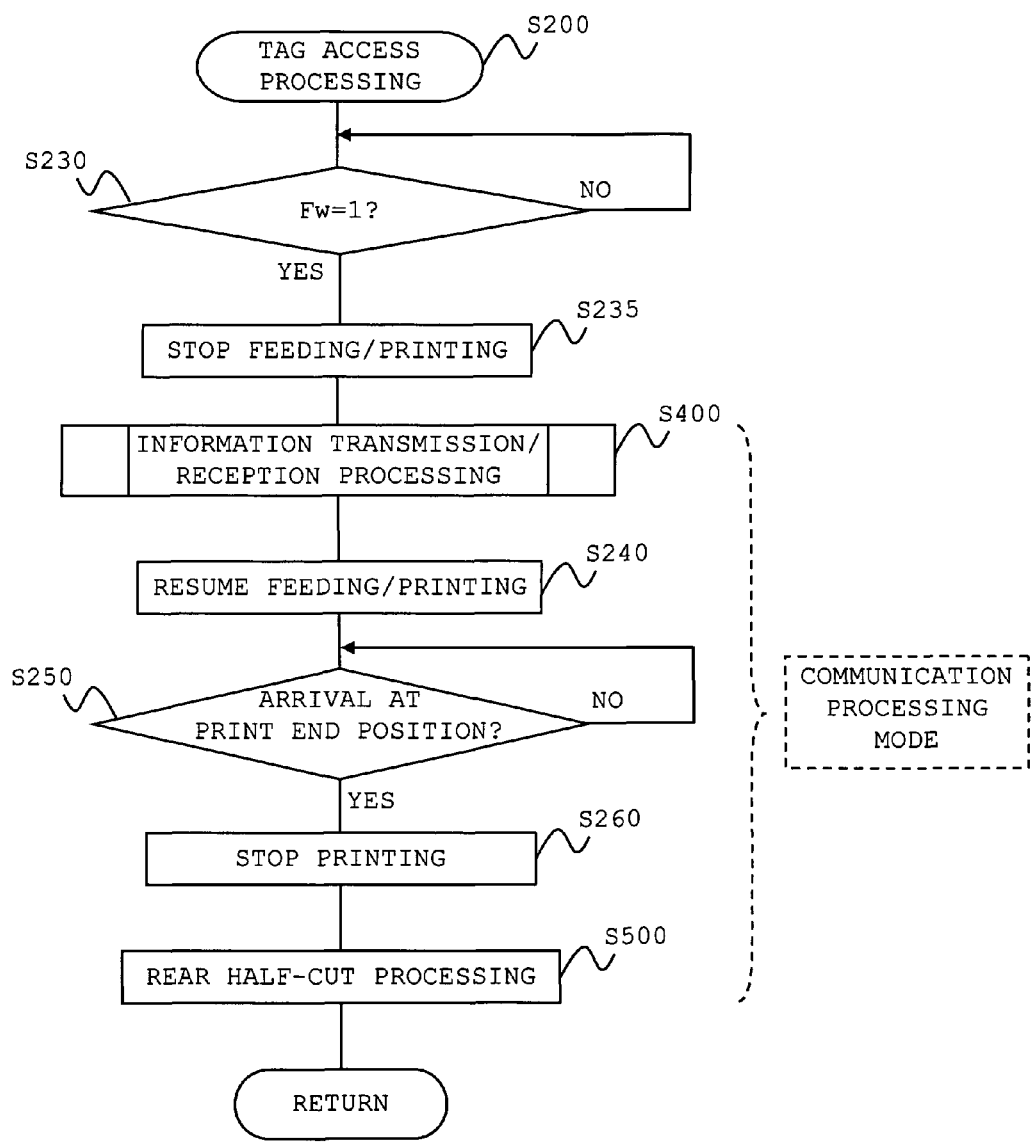

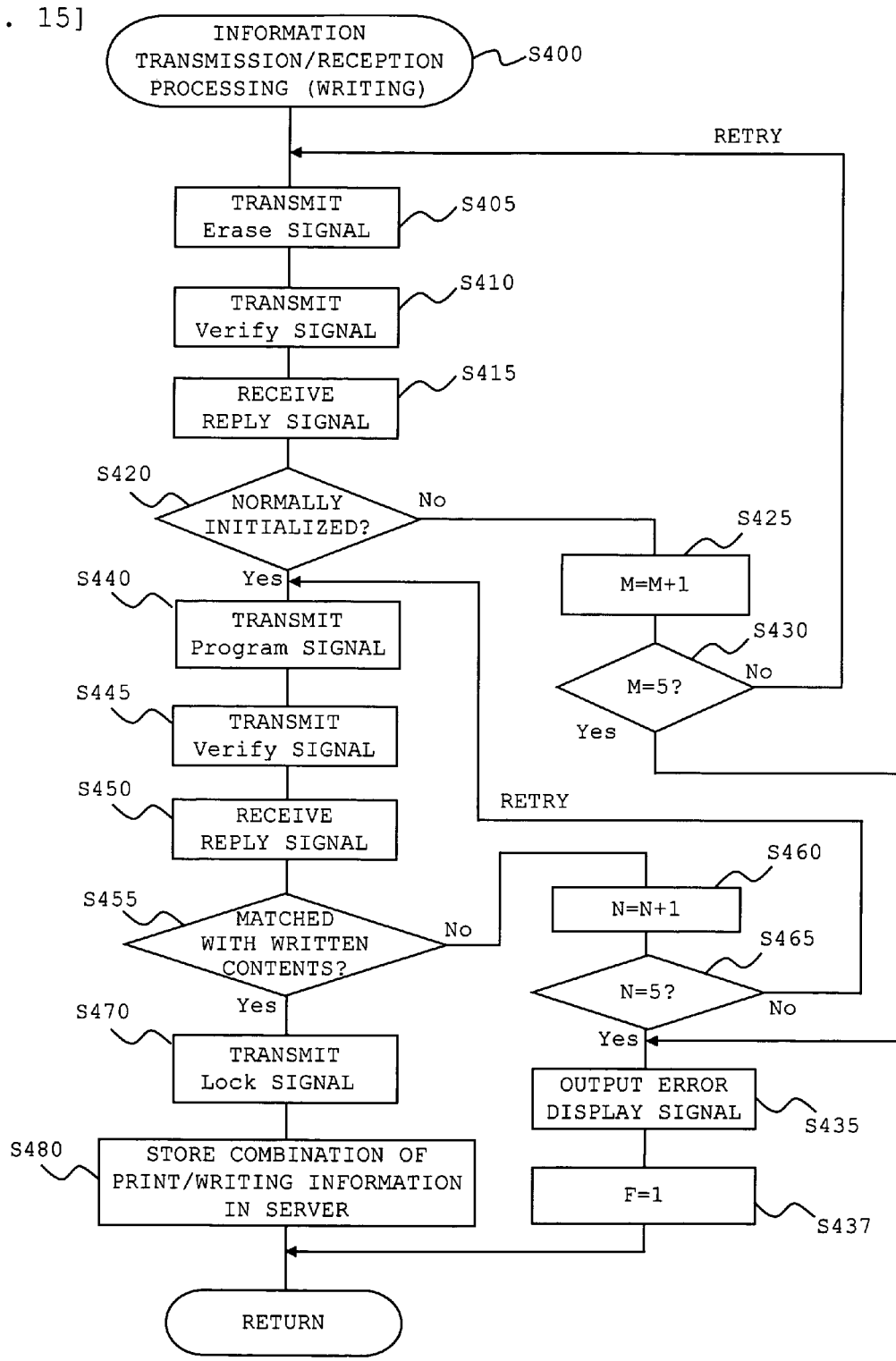

[FIG. 16]
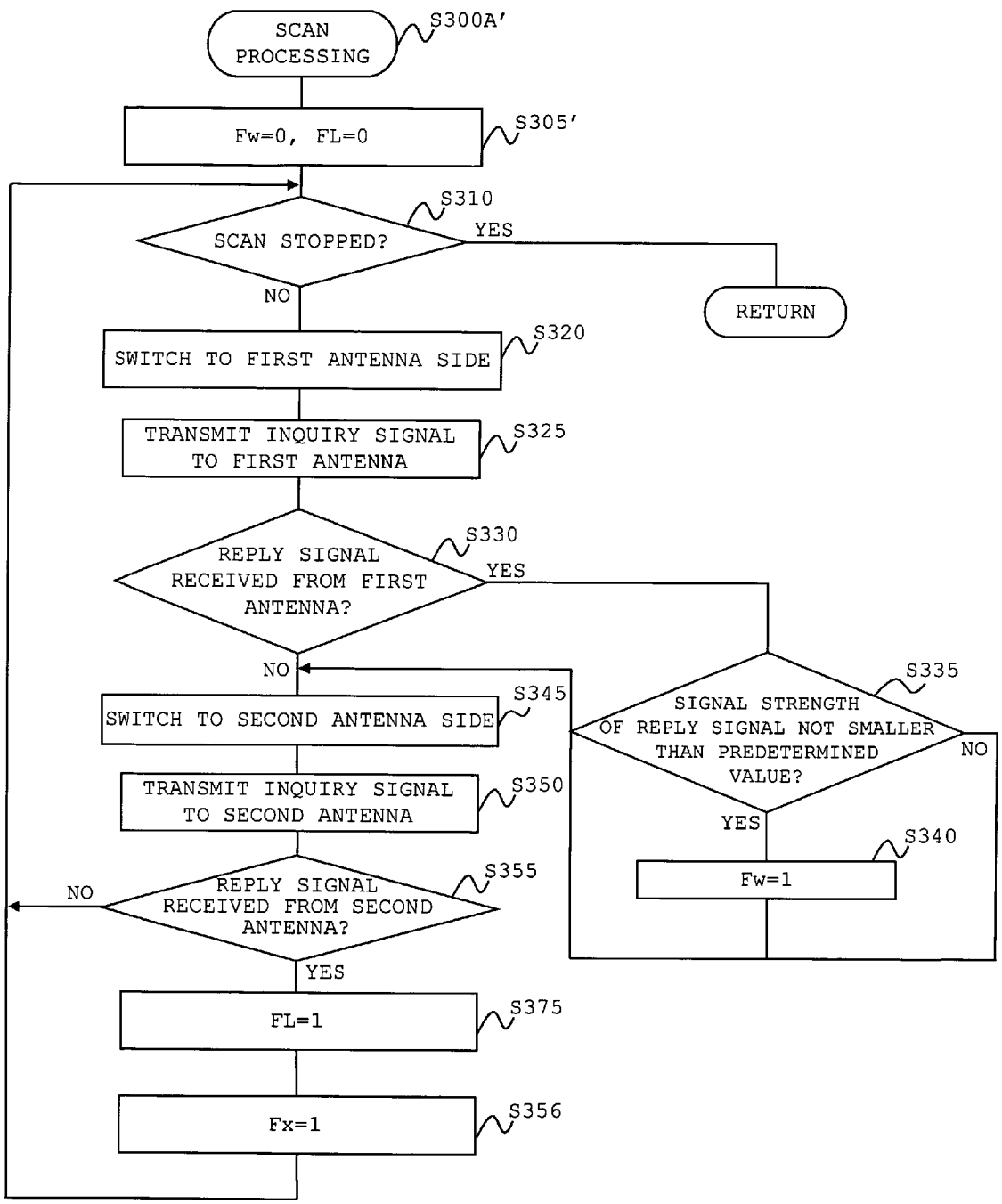

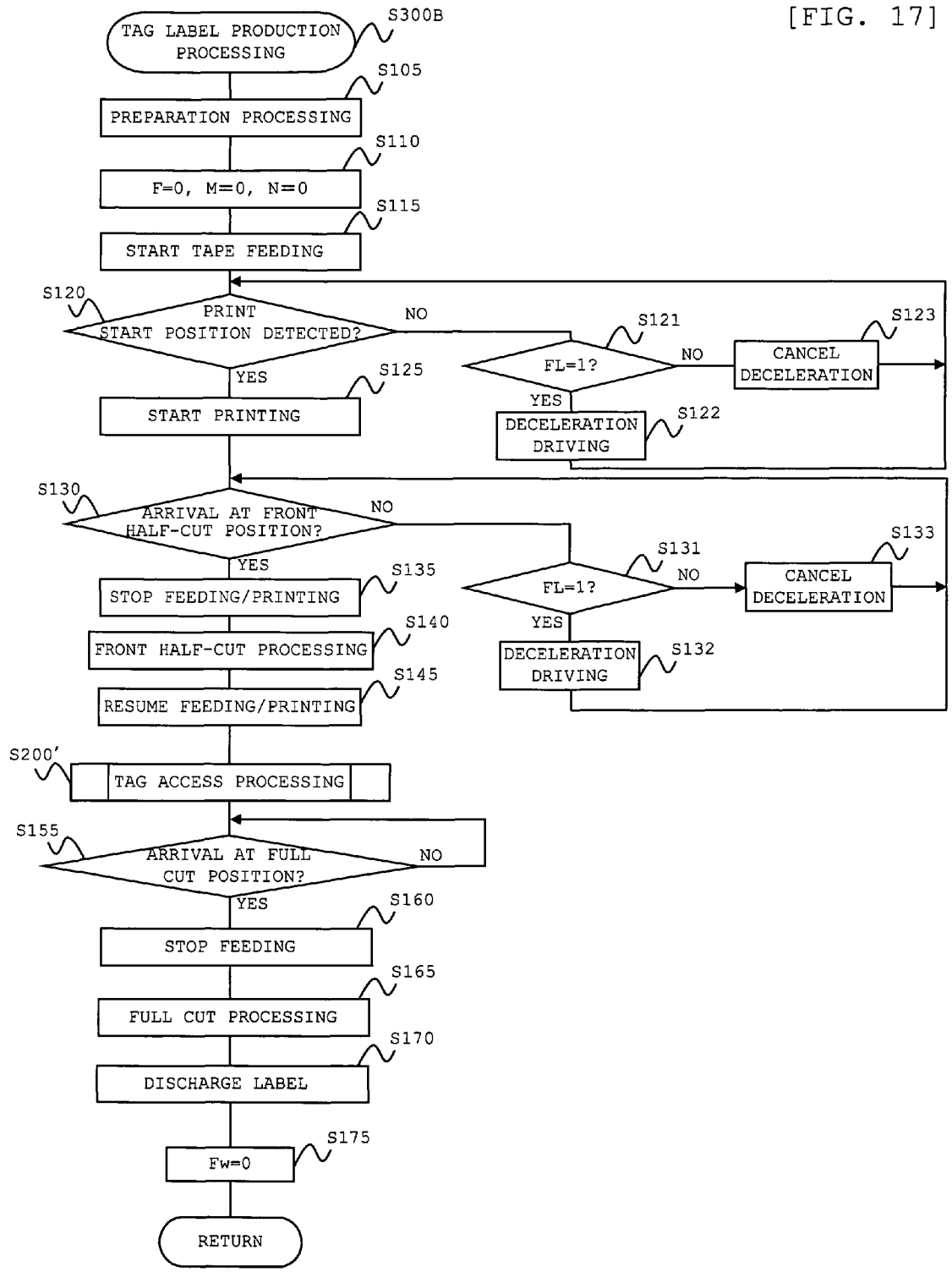
[FIG. 17]

[FIG. 18]
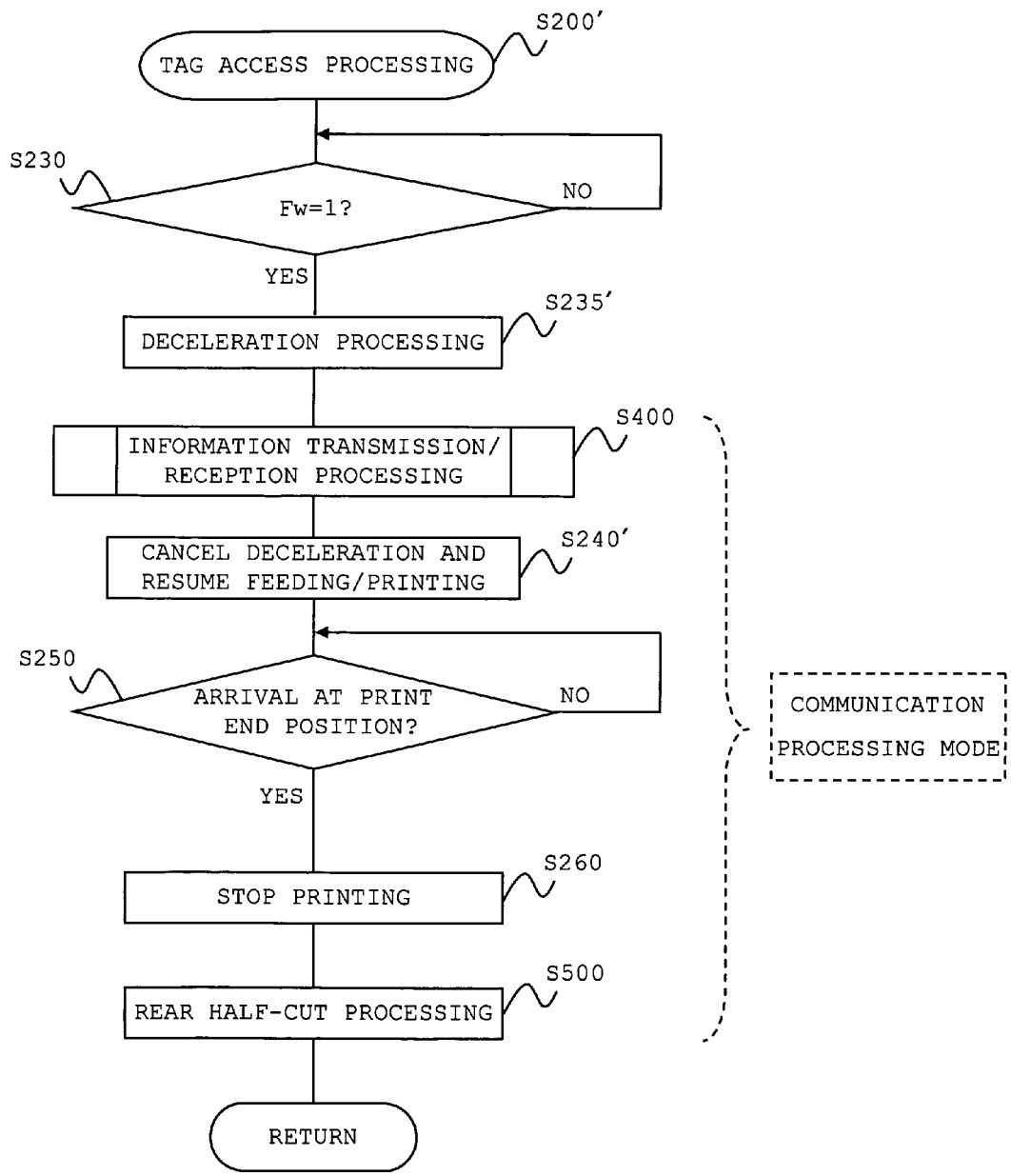

APPARATUS FOR COMMUNICATING WITH RFID TAG

CROSS-REFERENCE TO RELATED APPLICATION

This is a CIP application PCT/JP2007/73782, filed Dec. 10, 2007, which was not published under PCT article 21(2) in English and claims the benefits of Japanese Patent application No. 2006-333427 filed Dec. 11, 2006.

BACKGROUND OF THE INVENTION

1. Field of the Invention

The present invention relates to an apparatus for communicating with a RFID tag configured to carry out information transmission/reception with a RFID circuit element that carries out radio communication of information with an outside.

2. Description of the Related Art

A RFID (Radio Frequency Identification) system configured to read/write information contactlessly between a small-sized RFID tag and a reader (reading device)/writer (writing device) is known. A RFID circuit element provided at a label-shaped RFID tag is, for example, provided with an IC circuit part storing predetermined RFID tag information and an antenna connected to the IC circuit part and carrying out information transmission/reception. If a transmission wave is transmitted to a RFID circuit element from the antenna of the reader as an interrogator, the RFID circuit element transmits a reply using energy in an electric wave of the transmission wave. Prior-arts that read out information from the RFID circuit element using such a reader include the one described in JP, A, 2005-298100, for example.

In this prior art, an operation terminal (PC) and a reader are connected and by performing a predetermined operation at the operation terminal, a file or stored information of the RFID circuit element held by a human is read out from the reader and obtained.

On the other hand, an apparatus for producing RFID label configured to produce a RFID label by writing RFID tag information in such a RFID circuit element, for example, has been already proposed (See JP, A, 2005-186567, for example). In this prior art, a band-shaped tag tape (base tape) on which RFID circuit elements are provided with a predetermined interval is fed out of a roll of a tape with RFID tags (first roll) and a print-receiving tape fed out of another roll (second roll) is bonded to the tag tape. At this time, predetermined RFID tag information created on the side of the apparatus is transmitted to the RFID circuit element of the tag tape and written in the IC circuit part, printing corresponding to the RFID tag information written in at that time is performed on the print-receiving tape by printing device, and thereby a RFID label with print is produced.

In general, a RFID label produced by an apparatus for producing RFID label as described in JP, A, 2005-186567 is provided in association with a management target (article and the like) by being affixed thereto and the like. The RFID tag information is read out from the RFID label provided at the product and the like by a reader as described in JP, A, 2005-298100 so that information relating to the product is gotten and the product is managed and the like. In order to produce a RFID label and actually carry out product management and the like using the label in this way, both functions of the reader and the apparatus for producing RFID label are needed.

Here, the reader in the above prior art is provided with a communication circuit (radio frequency circuit) that generates a transmission signal to the RFID circuit element and carries out receiving processing and the like of a reply signal from the RFID circuit element and an antenna configured to transmit the transmission signal and to receive the reply signal. The apparatus for producing RFID label in the prior art is also provided with a communication circuit (radio frequency circuit) that creates information to be written in and an antenna. Therefore, by configuring so that at least a relatively expensive communication circuit portion can be made common, simplification of equipment configuration and reduction in a cost burden on a user can be promoted, but there has been no such prior art giving consideration to that point.

SUMMARY OF THE INVENTION

An object of the present invention is to provide an apparatus for communicating with a RFID tag that can simplify equipment configuration and reduce a cost burden on a user by making a communication circuit portion common.

BRIEF DESCRIPTION OF THE DRAWING

FIG. 1 is a system configuration diagram illustrating a RFID tag manufacturing system provided with an apparatus for communicating with a RFID tag, which is an embodiment of the present invention.

FIG. 2 is a perspective view illustrating an entire structure of the apparatus for communicating with a RFID tag.

FIG. 3 is a perspective view illustrating a structure of an internal unit inside the apparatus for communicating with a RFID tag.

FIG. 4 is a plan view illustrating a structure of an internal unit inside the apparatus for communicating with a RFID label.

FIG. 5 is an enlarged plan view schematically illustrating a detailed structure of a cartridge.

FIG. 6 is a functional block diagram illustrating a control system of the apparatus for communicating with a RFID label, which is an embodiment of the present invention.

FIG. 7 is a functional block diagram illustrating a functional configuration of a RFID circuit element.

FIGS. 8A and 8B are a top view and a bottom view respectively illustrating an example of an appearance of the RFID label formed by completing information writing on (or reading from) the RFID circuit element for label production and cutting of the tag label tape with print by the apparatus for communicating with a RFID label.

FIGS. 9A and 9B are a view obtained by rotating the cross sectional view by IXA-IXA' section in FIG. 8 counterclockwise by 90° and a view obtained by rotating the cross sectional view by IXB-IXB' section in FIG. 8 counterclockwise by 90°, respectively.

FIGS. 10A and 10B are flowcharts illustrating a control procedure executed by a control circuit.

FIG. 11 is a flowchart illustrating a detailed procedure of scan processing shown in FIG. 10B.

FIG. 12 is a time chart illustrating an example of a temporal behavior of transmission of an inquiry signal together with an example of a response signal.

FIG. 13 is a flowchart illustrating a detailed procedure of tag label production processing shown in FIG. 10A.

FIG. 14 is a flowchart illustrating a detailed procedure of Step S200 shown in FIG. 13.

FIG. 15 is a flowchart illustrating a detailed procedure of Step S400 shown in FIG. 14.

FIG. 16 is a flowchart illustrating a detailed procedure of Step S300A' in the control procedure executed by the control circuit in a variation.

FIG. 17 is a flowchart illustrating a detailed procedure of Step S300B' in the control procedure executed by the control circuit in a variation.

FIG. 18 is a flowchart illustrating a detailed procedure of Step S200' shown in FIG. 17.

DETAILED DESCRIPTION OF THE PREFERRED EMBODIMENTS

An apparatus for communicating with a RFID tag according to an embodiment of the present invention will be described below referring to the attached drawings. This embodiment is an embodiment in which the present invention is applied to a manufacturing system of RFID label.

FIG. 1 is a system configuration diagram illustrating a RFID tag manufacturing system provided with the apparatus for communicating with a RFID tag of this embodiment.

In a RFID tag manufacturing system TS shown in FIG. 1, an apparatus 1 for communicating with a RFID tag is connected to a route server RS, a plurality of information servers IS, a terminal 118a, and a general-purpose computer 118b through a wired or wireless communication line NW. The terminal 118a and the general-purpose computer 118b are collectively referred to simply as "PC 118" below as appropriate.

FIG. 2 is a perspective view illustrating an entire structure of the apparatus 1 for communicating with a RFID tag.

In FIG. 2, the apparatus 1 for communicating with a RFID tag produces a RFID label with print in the apparatus and reads (gets) information from the RFID circuit element outside the apparatus on the basis of an operation from the PC 118. The apparatus 1 for communicating with a RFID tag has an apparatus main body 2 having a substantially hexagonal (substantially cubic) housing 200 on the outline and an opening/closing lid 3 provided on an upper face of the apparatus main body 2, capable of being opened/closed.

The housing 200 of the apparatus main body 2 comprises a front wall 10 located at the apparatus front side (left front side in FIG. 2) and provided with a label carry-out exit 11 configured to discharge a RFID label T (which will be described later) produced inside the apparatus main body 2 to the outside and a front lid 12 provided below the label carry-out exit 11 in the front wall 10 and having its lower end rotatably supported.

The front lid 12 is provided with a pusher portion 13, and the front lid 12 is opened forward by pushing in the pusher portion 13 from above. Below an opening/closing button 4 in the front wall 10, a power button 14 configured to power on/off the apparatus 1 for communicating with a RFID tag is provided. Below the power button 14, a cutter driving button 16 configured to drive a cutting mechanism 15 (See FIG. 3, which will be described later) disposed in the apparatus main body 2 through manual operation by a user is provided, and by pressing this button 16, a tag label tape 109 with print (See FIG. 4, which will be described later) is cut to a desired length so as to produce the RFID label T.

The opening/closing lid 3 is pivotally and rotatably supported at an end portion on the right depth side in FIG. 2 of the apparatus main body 2 and urged in an opening direction all the time through an urging member such as a spring. When the opening/closing button 4 arranged adjacent to the opening/closing lid 3 on the upper face of the apparatus main body 2 is pressed, lock between the opening/closing lid 3 and the apparatus main body 2 is released, and the lid is opened by an action of the urging member. At the center side portion of the opening/closing lid 3, a see-through window 5 covered by a transparent cover is provided.

FIG. 3 is a perspective view illustrating a structure of an internal unit 20 inside the apparatus 1 for communicating with a RFID tag (however, an antenna LC, which will be described later, is omitted). In FIG. 3, the internal unit 20 generally comprises a cartridge holder 6 configured to accommodate a cartridge 7, a printing mechanism 21 provided with a print head (thermal head) 23, the cutting mechanism 15, a half cutter 34 (See FIG. 6, which will be described later), and a label discharge mechanism 22 configured to discharge the RFID label T (See FIG. 8, which will be described later) from the label carry-out exit 11 (See FIG. 2).

FIG. 4 is a plan view illustrating the structure of the internal unit 20 shown in FIG. 3. FIG. 5 is an enlarged plan view schematically illustrating a detailed structure of the cartridge 7.

In FIGS. 4 and 5, the cartridge holder 6 stores the cartridge 7 so that the direction in the width direction of the tag label tape 109 with print discharged from the label carry-out exit 11 should be in the perpendicular direction. The cartridge 7 has a housing 7A, a first roll 102 (actually, it is wound in a swirl state but shown concentrically in the figure for simplification) arranged inside the housing 7A and around which the base tape 101 (tag medium) in the band state is wound, a second roll 104 (actually, it is wound in a swirl state but shown concentrically in the figure for simplification) around which a transparent cover film 103 having substantially the same width as that of the base tape 101 is wound, a ribbon-supply-side roll 111 that feeds out an ink ribbon 105 (thermal transfer ribbon, however, it is not needed when the print-receiving tape is a thermal tape), a ribbon take-up roller 106 that winds up the ribbon 105 after printing, and a tape feeding roller 27 rotatably supported in the vicinity of a tape discharge portion 30 of the cartridge 7.

The tape feeding roller 27 presses and bonds the base tape 101 and the cover film 103 together so as to have the tag label tape 109 with print and feeds the tape in a direction shown by an arrow A (also functioning as a tape feeding roller).

In the first roll 102, the base tape 101 in which a plurality of RFID circuit elements To is sequentially formed in the longitudinal direction with a predetermined equal interval is wound around a reel member 102a. The base tape 101 has a four-layered structure (See the partially enlarged view in FIG. 5) in this example and is constructed by lamination in the order of an adhesive layer 101a made of an appropriate adhesive, a colored base film 101b made of PET (polyethylene terephthalate) and the like, an adhesive layer 101c made of an appropriate adhesive, and a separation sheet (separation material) 101d from the side wound inside (right side in FIG. 5) toward the opposite side (left side in FIG. 5).

On the back side of the base film 101b (left side in FIG. 5), a loop antenna 152 (tag antenna) constructed in the loop-coil shape for transmission/reception of information is provided integrally in this embodiment, the IC circuit part 151 connected to it and storing information is formed, and the RFID circuit element To is costituted by them.

On the front side of the base film 101b (right side in FIG. 5), the adhesive layer 101a that bonds the cover film 103 later is formed, while on the back side of the base film 101b (left side in FIG. 5), the separation sheet 101d is bonded to the base film 101b by the adhesive layer 101c provided so as to include the RFID circuit element To.

When the RFID label T finally completed in the label state is to be affixed to a predetermined article or the like, the separation sheet 101d enables adhesion to the article and the like by the adhesive layer 101c through separation of the separation sheet. Also, on the surface of the separation sheet 101d, at a predetermined position (in this embodiment, a position on the further front from a distal end of the antenna 152 in the front side in the feeding direction) corresponding to each RFID circuit element To, a predetermined identification mark PM for feeding control (an identification mark painted in black in this embodiment. Alternatively, it may be a drilled hole penetrating through the base tape 101 by laser machining or the like or it may be a Thomson type machined hole or the like.) is provided.

The second roll 104 has the cover film 103 wound around a reel member 104a. In the cover film 103 fed out of the second roll 104, the ribbon 105 driven by the ribbon-supply-side roll 111 and the ribbon take-up roller 106, which are arranged on the back face side of the cover film 103 (that is, the side to be affixed to the base tape 101), is brought into contact with the back face of the cover film 103 by being pressed by the print head 23.

The ribbon take-up roller 106 and the tape feeding roller 27 are rotated and driven, respectively, in conjunction by a driving force of a feeding motor 119 (See FIG. 3 and FIG. 6, which will be described later), which is a pulse motor, for example, provided outside the cartridge 7, transmitted to a ribbon take-up roller driving shaft 107 and a feeding roller driving shaft 108 (feeding device) through a gear mechanism, not shown.

On the other hand, the print head 23 provided with a large number of heater elements is mounted to a head mounting portion 24 installed upright on the cartridge holder 6 and arranged on an upstream side in the feeding direction of the cover film 103 rather than the tape feeding roller 27.

Also, on the front (lower side in FIG. 4) of the cartridge 7 in the cartridge holder 6, a roller holder 25 is pivotally and rotatably supported by a support shaft 29 so that switching can be made between a printing position (contact position, see FIG. 4) and a release position (separated position) by a switching mechanism. At this roller holder 25, a platen roller 26 and a driven feed roller 28 are rotatably disposed, and when the roller holder 25 is switched to the printing position, the platen roller 26 and the driven feed roller 28 are pressed onto the print head 23 and the tape feeding roller 27.

In the above construction, the base tape 101 fed out of the first roll 102 is supplied to the tape feeding roller 27. On the other hand, as for the cover film 103 fed out of the second roll 104, the ink ribbon 105 driven by the ribbon-supply-side roll 111 and the ribbon take-up roller 106, which are arranged on the back face side of the cover film 103 (that is, the side bonded to the base tape 101), is pressed by the print head 23 and brought into contact with the back face of the cover film 103.

When the cartridge 7 is attached to the cartridge holder 6 and the roller holder 25 is moved from the release position to the print position, the cover film 103 and the ink ribbon 105 are held between the print head 23 and the platen roller 26, and the base tape 101 and the cover film 103 are held between the tape feeding roller 27 and the driven feed roller 28. Then, the ribbon take-up roller 106 and the tape feeding roller 27 are rotated and driven by the driving force of the feeding motor 119 in a direction shown by an arrow B and an arrow C, respectively, in synchronization with each other. At this time, the feeding roller driving shaft 108, the driven feed roller 28 and the platen roller 26 are connected through the gear mechanism (not shown), and with the driving of the feeding roller driving shaft 108, the tape feeding roller 27, the driven feed roller 28, and the platen roller 26 are rotated, and the base tape 101 is fed out of the first roll 102 and supplied to the tape feeding roller 27 as mentioned above. On the other hand, the cover film 103 is fed out of the second roll 104, and the plurality of heater elements of the print head 23 is electrified by a print-head driving circuit 120 (See FIG. 6, which will be described later). As a result, a print R (See FIG. 8, which will be described later) corresponding to the RFID circuit element To on the base tape 101 to become a bonding target is printed on the back face of the cover film 103. Then, the base tape 101 and the cover film 103 on which the printing has been finished are bonded together by the tape feeding roller 27 and the driven feed roller 28 to be integrated and formed as the tag label tape 109 with print and fed out of the cartridge 7 through the tape discharge portion 30. The ink ribbon 105 finished with printing on the cover film 103 is taken up by the ribbon take-up roller 106 by driving of the ribbon take-up roller driving shaft 107.

On the upper face of the housing 7A in the cartridge 7, a tape identification display portion 8 that displays tape width, tape color and the like of the base tape 101 built in the cartridge 7, for example, is provided. When the cartridge 7 is attached to the cartridge holder 6 and the opening/closing lid 3 is closed, the above-mentioned see-through window 5 and the tape identification display portion 8 are opposed to each other, and the tape identification display portion 8 can be visually recognized from outside the apparatus main body 2 through the transparent cover of the see-through window 5. As a result, the type and the like of the cartridge 7 attached to the cartridge holder 6 can be visually recognized easily from outside the apparatus main body 2 through the see-through window 5.

Also, at a corresponding position of the cartridge holder 6, a cartridge sensor 81 configured to detect an attached state of the cartridge 7 is provided, and a detection signal of the cartridge sensor 81 is input into a control circuit 110 (See FIG. 6, which will be described later).

The internal unit 20 is provided with a first antenna (antenna for label production) LC1, which has a communicable region inside of the housing 200 and is a loop antenna capable of information transmission/reception to the RFID circuit element To for label production provided at the tag label tape 109 with print and a second antenna (antenna for information acquisition) LC2, which has a communicable region outside of the housing 200 and is a loop antenna capable of information transmission/reception to the RFID circuit element To for information acquisition located outside the housing 200. Between the first antenna LC1 and the second antenna LC2, a shield member 85 made of metal, for example, that shields a magnetic flux generated from the antennas LC1, LC2 is provided.

After information reading or writing has been done with the RFID circuit element To for label production by the first antenna LC1 to the tag label tape 109 with print produced by bonding as above, the tag label tape 109 with print is cut by the cutting mechanism 15 automatically or through an operation of the cutter driving button 16 (See FIG. 2), and the RFID label T is produced. The RFID label T is discharged by the label discharge mechanism 22 from the label carry-out exit 11 (See FIG. 2) after that.

The cutting mechanism 15 is provided with a fixed blade 40, a movable blade 41 constructed by a metal member and performing a cutting operation with the fixed blade 40, a cutter helical gear 42, (See FIG. 3) coupled to the movable blade 41, and a cutter motor 43 (see FIG. 3) coupled to the cutter helical gear 42 by a gear train.

The label discharge mechanism 22 is disposed in the vicinity of the label carry-out exit 11 provided on the front wall 10 of the apparatus main body 2 and has a function as a discharge device to forcedly discharge the tag label tape 109 with print after it is cut in the cutting mechanism 15 (in other words, the RFID label T, the same applies to the following) from the label carry-out exit 11. That is, the label discharge mechanism 22 comprises a driving roller 51, a pressure roller 52 opposed to the driving roller 51 with the tag label tape 109 with print between them, a pressure operation mechanism portion 53 (See FIG. 3) configured to press the pressure roller 52 onto the tag label tape 109 with print or to release the pressure, and a discharge driving mechanism portion 54 (See FIG. 3) configured to rotate so as to discharge the tag label tape 109 with print by the driving roller 51 in conjunction with a pressure release operation of the pressure operation mechanism portion 53. Also, the label discharge mechanism 22 has a mark sensor 127 (See FIG. 6 and the like, which will be discharged later) that detects an identification mark PM provided on the separation sheet 101d of the tag label tape 109 with print.

At this time, first guide walls 55, 56 and second guide walls 63, 64 that guide the tag label tape 109 with print to the label carry-out exit 11 are provided inside the label carry-out exit 11. The first guide walls 55, 56 and the second guide walls 63, 64 are integrally formed, respectively, and arranged at a discharge position of the tag label tape 109 with print cut by the fixed blade 40 and the movable blade 41 so that they are separated from each other with a predetermined interval.

The pressure operation mechanism portion 53 is, as shown in the above-mentioned FIG. 3, constituted by a roller support holder 57, a roller support portion 58 mounted on the roller support holder 57 and holding the pressure roller 52 at its distal end portion, a holder support portion 59 that rotatably supports the roller support holder 57, a cam 60 that drives the pressure operation mechanism portion 53 in conjunction with the cutting mechanism 15, and an urging spring 61.

The roller support portion 58 rotatably supports the pressure roller 52 so as to sandwich it from the vertical direction. When the roller support holder 57 is rotated in the counter-clockwise direction (arrow 71 direction in FIG. 3) around a holder support shaft 59 through the cam 60 by means of rotation of the cutter helical gear 42, the pressure roller 52 is pressed onto the tag label tape 109 with print. When the cutter helical gear 42 is rotated again, the holder support shaft 59 is rotated by the urging spring 61 in the direction opposite to the above, and the pressure roller 52 is separated from the tag label tape 109 with print.

The discharge driving mechanism portion 54 is constituted by a tape discharge motor 65 and a gear train 66, and after the tag label tape 109 with print is pressed by the pressure roller 52 onto the driving roller 51, the tape discharge motor 65 is driven and the driving roller 51 is rotated in a discharge direction of the tag label tape 109 with print so that the tag label tape 109 with print is forcedly discharged in the discharge direction.

FIG. 6 is a functional block diagram illustrating a control system of the apparatus 1 for communicating with a RFID tag of this embodiment. In FIG. 6, a control circuit 110 is arranged on a control board (not shown) of the apparatus 1 for communicating with a RFID tag.

In the control circuit 110, a CPU 111 that is provided with a timer 111A inside and controls each equipment, an input/output interface 113 connected to the CPU 111 through a data bus 112, a CGROM 114, a ROM 115, 116, a RAM 117, and a non-volatile memory 1171 are provided.

The CGROM 114 stores dot pattern data for display in relation to each of a large number of characters corresponding to code data.

The ROM (dot pattern data memory) 115 stores dot pattern data for printing in relation to each of a large number of characters for printing characters such as alphabets and symbols, classified according to font (Gothic font, Min dynasty font and the like) in association with print character size and code data for each font. Also, graphic pattern data for printing graphic images including gradation presentation is stored.

In the ROM 116, a print driving control program for driving the print head 23, the feeding motor 119, and the tape discharge motor 65 by reading out data of a print buffer in association with code data such as characters and numerals input from the PC 118, a pulse number determining program for determining the number of pulses corresponding to an energy amount for forming each print dot, a cutting driving control program for feeding the tag label tape 109 with print to the cut position by driving the feeding motor 119 when printing is finished and cutting the tag label tape 109 with print by driving the cutter motor 43, a tape discharge program for forcedly discharging the tag label tape 109 with print which has been cut (=RFID label T) from the label carry-out exit 11 by driving the tape discharge motor 65, and other various programs required for control of the apparatus 1 for communicating with a RFID tag are stored. The CPU 111 executes various calculations on the basis of the various programs stored in the ROM 116.

In the RAM 117, a text memory 117A, a print buffer 117B, a parameter storage area 117E and the like are provided. In the text memory 117A, document data input from the PC 118 is stored. In the print buffer 117B, the dot patterns for print such as a plurality of characters and symbols and applied pulse number, which is an energy amount forming each dot, are stored as the dot pattern data, and the print head 23 carries out dot printing according to the dot pattern data stored in this print buffer 117B. In the parameter storage area 117E, various calculation data, tag identification information (tag ID) of the RFID circuit element To for information acquisition when information reading (acquisition) is carried out and the like are stored. In the non-volatile memory 1171, acquisition information read out from the RFID circuit element To is stored.

To the input/output interface 113, the PC 118, the printhead driving circuit 120 that drives the print head 23, a feeding motor driving circuit 121 that drives the feeding motor 119, a cutter motor driving circuit 122 that drives the cutter motor 43, a half-cutter motor driving circuit 128 that drives a half-cutter motor 129, a tape discharge motor driving circuit 123 that drives the tape discharge motor 65, a transmitting circuit 306 that generates a carrier wave for making an access (for reading/writing) to the RFID circuit element To through the antenna LC1 or LC2 and modulates the carrier wave on the basis of a control signal input from the control circuit 110, a receiving circuit 307 that demodulates a response signal received from the RFID circuit element To through the loop antennas LC1, LC2, detects strengths of a demodulated received signal and the response signal and outputs the signal strength to the control circuit 110, the mark sensor 127 that detects the identification mark PM, the cartridge sensor 81 that detects the attached state of the cartridge 7, a tape cut sensor 124, and a cut release detection sensor 125 are connected.

The transmitting circuit 306 and the receiving circuit 307 are connected to the antennas LC1, LC2 through an antenna sharing device 240 and a switching circuit 86. At this time, the receiving circuit 307 is provided with an RSSI (Received Signal Strength Indicator) circuit 307A (signal strength detecting device) that detects the strength of the received signal received through the switching circuit 86 and the antenna sharing device 240, and a signal "RSSI" indicating the detected signal strength is also input to the control circuit 110.

The switching circuit 86 carries out switching so that the antenna sharing device 240 is connected to the first antenna LC1 or the second antenna LC2 on the basis of a control signal from the control circuit 110. Specifically, the control circuit 110 executes control so that switching is made between a mode in which the switching circuit 86 is switched to an "a" side so as to connect the antenna sharing device 240 and the first antenna LC1 and a mode in which the switching circuit 86 is switched to a "b" side so as to connect the antenna sharing device 240 and the second antenna LC2 with a predetermined cycle (specifically, as will be described later, more than a cycle of the sum of time of a transmitted call signal and a response signal received if the RFID circuit element operates and returns a response).

In a control system around the control circuit 110 as above, if character data and the like is input through the PC 118, the text (document data) is sequentially stored in the text memory 117A, the print head 23 is driven through the driving circuit 120, each heater element is selectively heated and driven in response to a print dot for one line so as to print the dot pattern data stored in the print buffer 117B, and the feeding motor 119 carries out feeding control of the tape through the driving circuit 121 in synchronization. Also, the transmitting circuit 306 carries out modulation control of the carrier wave on the basis of the control signal from the control circuit 110, and the receiving circuit 307 carries out processing of a signal demodulated on the basis of the control signal from the control circuit 110.

The tape cut sensor 124 and the cut release detection sensor 125 are constituted by a cam for cutter helical gear and a micro switch (not shown) provided on a cylindrical outer wall of the cutter helical gear 42, for example. Specifically, if the cutter helical gear 42 is rotated by the cutter motor 43, the micro switch is switched by means of an action of the cam for cutter helical gear from an off state to an on state and detects that cutting of the tag label tape 109 with print by the movable blade 41 has been completed. The tape cut sensor 124 is constituted by them. If the cutter helical gear 42 is further rotated, the micro switch is switched by the action of the cam for cutter helical gear from the on state to the off state and detects that the movable blade has returned to a release position. The cut release detection sensor 125 is constituted by them.

FIG. 7 is a functional block diagram illustrating a functional configuration of the RFID circuit element To. In FIG. 7, the RFID circuit element To has the loop antenna 152 that carries out transmission/receiving of a signal contactlessly using magnetic induction with the antennas LC1, LC2 on the side of the apparatus 1 for communicating with a RFID tag and the IC circuit part 151 connected to the loop antenna 152.

The IC circuit part 151 is provided with a rectification part 153 that rectifies the carrier wave received by the loop antenna 152, a power source part 154 that accumulates energy of the carrier wave rectified by the rectification part 153 to make it a driving power source, a clock extraction part 156 that extracts a clock signal from the carrier wave received by the loop antenna 152 and supplies it to a control part 155, a memory part 157 that can store predetermined information signals, a modem part 158 connected to the loop antenna 152, and the control part 155 that controls operation of the RFID circuit element To through the rectification part 153, the clock extraction part 156, the modem part 158 and the like.

The modem part 158 demodulates a communication signal from the antennas LC1, LC2 of the apparatus 1 for communicating with a RFID tag received by the loop antenna 152 and modulates a carrier wave received at the loop antenna 152 on the basis of a reply signal from the control part 155 and transmits it as a reflected wave from the loop antenna 152.

The control part 155 interprets a received signal demodulated by the modem part 158, generates a reply signal on the basis of an information signal stored in the memory part 157, and executes basic control such as control to reply by the modem part 158.

The clock extraction portion 156 extracts a clock component from the received signal and extracts a clock to the control portion 155 and supplies a clock corresponding to a frequency of the clock component of the received signal to the control part 155.

FIGS. 8A and 8B are views illustrating an example of an appearance of the RFID label T formed by completing information writing (or reading) of the RFID circuit element To for label production and cutting of the tag label tape 109 with print by the apparatus 1 for communicating with a RFID tag configured as above, in which FIG. 8A is a top view, and FIG. 8B is a bottom view. Also, FIG. 9A is a view obtained by rotating the cross sectional view by IXA-IXA' section in FIG. 8 counterclockwise by 90°, and FIG. 9B is a view obtained by rotating the cross sectional view by IXB-IXB' section in FIG. 8A counterclockwise by 90°.

In FIGS. 8 and 9, the RFID label T is in the five-layered structure in which the cover film 103 is added to the four-layered structure shown in FIG. 5 as mentioned above, and the five layers comprise the cover film 103, the adhesive layer 101a, the base film 101b, the adhesive layer 101c, and the separation sheet 101d from the side of the cover film 103 (upper side in FIG. 9) to the opposite side (lower side in FIG. 9). The RFID circuit element To for label production including the loop antenna 152 provided on the back side of the base film 101b as mentioned above is provided in the base film 101b and the adhesive layer 101c, and a label print R (characters of "RF-ID" indicating a type of the RFID table T in this example) corresponding to stored information or the like of the RFID circuit element To for label production is printed on the back face of the cover film 103.

On the cover film 103, the adhesive layer 101a, the base film 101b, and the adhesive layer 101c, a half-cut line HC (half-cut portion. However, two lines of a front half-cut line HC1 and a rear half-cut line HC2 in this example) is formed by the half cutter 34 substantially along the tape width direction as mentioned above. A region held between the half-cut lines HC1, HC2 in the cover film 103 becomes a print region S on which the label print R is to be printed, and a region on both sides in the tape longitudinal direction having the half-cut lines HC1, HC2 between them from the print region S becomes a front margin region S1 and a rear margin region S2. In other words, the front and rear margin regions S1, S2 and the print region S of the cover film 103 are separated by the half-cut lines HC1, HC2.

In the apparatus 1 for communicating with a RFID tag with the basic configuration as above, control is executed by the control circuit 110 so that processing corresponding to the communication processing mode for producing the RFID label T using the tag label tape 109 with print provided with the RFID circuit element To for label production or the processing corresponding to the information acquisition processing mode for information reading (acquisition) processing of the RFID circuit element To for information acquisition outside the housing 200.

FIGS. 10A and 10B are flowcharts illustrating control procedures executed by the control circuit 110 in order to carry out the above control.

The flow shown in FIG. 10A is a main flow started when the apparatus 1 for communicating with a RFID tag is powered on, for example. First, at Step S30, it is determined if an instruction input of label production has been made by an operator, that is, an operation signal for label production has been input from the PC 118 and the like through the communication line NW and the input/output interface 113 or not. If there has not been an instruction input (that is, in a regular case), the determination is not satisfied but an instruction input is waited in a loop, while if there has been an instruction input, the determination is satisfied, and the routine goes to the subsequent Step S300B.

At Step S300B, the tag label production processing is carried out (for details, see FIG. 13, which will be described later), and the RFID label T is produced using the tag label tape 109 with print provided with the RFID circuit element To for label production. When the production is finished, the routine returns to Step S30, and the similar procedure is repeated.

The flow shown in FIG. 10B is a flow executed as interruption processing with a predetermined time interval (several msec to several tens sec, for example) to the main flow in FIG. 10A.

In FIG. 10B, first at Step S295, a reading processing mode flag Fx indicating if information reading from the RFID circuit element To for information acquisition has been completed or not is initialized to zero, and the routine goes to the subsequent Step S300A.

At Step S300A, scan processing is executed. That is, the first antenna LC1 and the second antenna LC2 are switched with a predetermined cycle T (which will be described later), an inquiry signal is alternately transmitted to the RFID circuit element To for label production and the RFID circuit element To for information acquisition, and if a response signal to the inquiry signal is received from the RFID circuit element To for information acquisition, the information of the RFID circuit element To for information acquisition is read out through the second antenna LC2 (for details, see FIG. 11, which will be described later). After that, the routine goes to Step S30.

At the subsequent Step S30, it is determined if the reading processing mode flag Fx=1 or not (See Step S356 in FIG. 11, which will be described later). If the information reading has not been completed and Fx=0, the determination is not satisfied and this flow is finished, while if the information reading has been completed and Fx=1, the determination is satisfied and the routine goes to Step S360.

At Step S360, it is determined if tag identification information (tag ID such as unique ID (UID)) of the RFID circuit element for information acquisition gotten from the received reply signal is different or not from the one having been already gotten by comparing it with the contents in the non-volatile memory 1171. If the tag ID is the same as the already-gotten one, the determination is not satisfied, and this flow is finished. If the tag ID is different from the already-gotten one, the determination is satisfied, and the routine goes to the subsequent Step S365. The processing at Step S360 may be omitted if it is not necessarily required.

At Step S365, on the basis of the received reply signal, the RFID tag information gotten from the RFID circuit element To for information acquisition as a reading target is processed as appropriate. The processing includes output of the gotten RFID tag information through the input/output interface 113 and the communication line NW (information output portion), storing the information in the information server IS and the route server RS so that the information can be referred to by the PC 118 as necessary, display thereof by a display device of the PC 118 and the like.

When the above Step S365 is finished, the routine goes to Step S366, where the information (including the tag ID such as unit ID (UID)) gotten from the received reply signal is stored in the non-volatile memory 1171 and this flow is finished.

FIG. 11 is a flowchart illustrating a detailed procedure of the scan processing at the above-mentioned Step S300A.

In FIG. 11, first, at Step S305, a communication processing mode flag Fw for writing information in the RFID circuit element To for label production is initialized to zero, and the routine goes to the subsequent Step S310.

At Step S310, it is determined if there has been an instruction input to stop scan from the operator, that is, if an operation signal to stop scan has been input or not from the PC 118 and the like through the communication line NW and the input/output interface 113, for example. If there has been an instruction input, this flow is finished. If there has not been an instruction input, the determination is not satisfied, and the routine goes to the subsequent Step S320.

At Step S320, a control signal is output to the switching circuit 86 so that the switching circuit 86 is switched and the antenna sharing device 240 and the first antenna LC1 are connected. Then, at the subsequent Step S325, a control signal is output to the transmitting circuit 306, and as an inquiry signal ("Scroll All ID", "Ping" signals and the like) for writing the information in the RFID circuit element To for label production, a carrier wave given predetermined modulation is transmitted to the RFID circuit element To for label production to be a target through the first antenna LC1, and a reply is prompted.

After that, at Step S330, it is determined if a reply signal (response signal) to the inquiry signal is transmitted from the RFID circuit element To for label production to be a target and the reply signal has been received through the first antenna LC1, switching circuit 86, antenna sharing device 240, and the receiving circuit 307 or not. If the reply signal has been received, the determination is satisfied and the routine goes to the subsequent Step S335, while if the reply signal has not been received, the determination is not satisfied and the routine goes to Step S345.

At Step S335, it is determined, on the basis of an output value (RSSI signal indicting a detected received signal strength) of the RSSI circuit 307A of the receiving circuit 307 when the reply signal is received, if the signal strength of the reply signal from the RFID circuit element To for label production received through the first antenna LC1 is not less than a predetermined threshold value (=a level that can be read out by a regular reading operation, for example) or not. If the signal strength of the reply signal is not less than the threshold value, the communication processing mode flag Fw is set to one at Step S340, and the routine goes to Step S345. If the signal strength of the reply signal is less than the threshold value, the routine goes to Step S345 without changing the communication processing mode flag Fw.

At Step S345, a control signal is output to the switching circuit 86 so that the switching circuit 86 is switched and the antenna sharing device 240 and the second antenna LC2 are connected. Then, at the subsequent Step S350, a control signal is output to the transmitting circuit 306, and as an inquiry signal ("Scroll All ID", "Ping" signals and the like) for getting the information stored in the RFID circuit element To for information acquisition, a carrier wave given predetermined modulation is transmitted to the RFID circuit element To for information acquisition to be a target through the second antenna LC2, and a reply is prompted.

After that, at Step S355, it is determined if a reply signal to the inquiry signal has been transmitted from the RFID circuit element To for information acquisition as a target and the reply signal has been received through the second antenna LC2, switching circuit 86, antenna sharing device 240, and the receiving circuit 307. If the reply signal has not been received, the routine returns to Step S310, where the similar procedure is repeated. As a result, while the reply signal is not received at either of the first antenna LC1 and the second antenna LC2, that is, while the determination is not satisfied during Step S320, ->Step S325->Step S330, the determination is not satisfied during Step S345->Step S350->Step S355 and Step S310 and after is repeated, switching is made by the switching circuit 86 with the predetermined cycle T so that transmission of an inquiry signal (interrogation signal) to the RFID circuit element To for label production through the first antenna LC1 and the transmission of the interrogation signal to the RFID circuit element To for information acquisition through the second antenna LC2 are carried out alternately. FIG. 12 is a time chart illustrating an example of a temporal behavior of the transmission of the interrogation signal together with an example of a response signal.

If the reply signal has been received at Step S355, the determination is satisfied, and the routine goes to the subsequent Step S356.

At Step S356, the above-mentioned reading processing mode flag Fx=1 is set, the routine returns to Step S310, and the similar procedure is repeated.

Though not particularly described here, but if the information reading is not successful, retries may be made predetermined times.

Also, in this example, the case in which not only identification information (tag ID) but also other data main body is included in the reply signal corresponding to the inquiry signal at Step S350 as the RFID tag information is explained, but not limited to that. That is, if only the identification information (tag ID) and the like is included and other data main body is not included in the response signal, it may be so configured that the target RFID circuit element To is specified using the tag ID gotten from the response signal at Step S355, the information request signal is transmitted again through the transmitting circuit 306 and the second antenna LC2, and the data main body included in the response signal is acquired.

FIG. 13 is a flowchart illustrating a detailed procedure of the tag label production processing at the above-mentioned Step S300B.

First, at Step S105, preparation processing is executed in which an operation signal from the PC 118 including printing data, communication data (writing data) with RFID circuit element To for label production, settings of front/rear half cut positions and full-cut position and the like are input (information input portion), and the printing data, communication data, half-cut position, full-cut position settings and the like are made on the basis of the input operation signal. By operating/editing and inputting information required for the preparation processing from the PC 118, convenience can be improved.

Subsequently, at Step S110, in communication from the first antenna LC1 to the RFID circuit element To for label production, variables M, N that count the number of times (access retry number times) to make communication retries (retries) if there is no response from the RFID circuit element To for label production and a flag F indicating if the communication was successful or not are initialized to zero.

After that, the routine goes to Step S115, where a control signal is output to the feeding motor driving circuit 121 through the input/output interface 113 so as to rotate and drive the tape feeding roller 27 and the ribbon take-up roller 106 by the driving force of the feeding motor 119. Moreover, a control signal is output to the tape discharge motor 65 through tape discharge motor driving circuit 123 so as to rotate and drive the driving roller 51. As a result, the base tape 101 is fed out of the first roll 102 and supplied to the tape feeding roller 27, while the cover film 103 is fed out of the second roll 104, the base tape 101 and the cover film 103 are bonded by the tape feeding roller 27 and the driven feed roller 28 to be integrated and formed as the tag label tape 109 with print and fed.

After that, at Step S120, on the basis of the detection signal of the mark detection sensor 127 input through the input/output interface 113, it is determined if the identifier PM of the base tape 101 has been detected or not (in other words, if the cover film 103 has reached a print start position by the print head 23 or not). The determination is not satisfied till the identifier PM is detected and this procedure is repeated, and if detected, the determination is satisfied and the routine goes to the subsequent Step S125.

At Step S125, a control signal is output to the print-head driving circuit 120 through the input/output interface 113, the print head 23 is electrified, and printing of the label print R such as the characters, symbols, and barcodes corresponding to the printing data created at Step S105 is started on the above-mentioned print region S (=region to be bonded substantially on the back face of the RFID circuit element To for label production arranged with an equal interval at a predetermined pitch on the base tape 101) in the cover film 103.

After that, at Step S130, it is determined if the tag label tape 109 with print has been fed to a front half-cut position set at the previous Step S105 or not (in other words, if the tag label tape 109 with print has reached a position where the half cutter 34 of the half-cut mechanism 35 is opposed to a front half-cut line HC1 set at Step S1 or not). The determination at this time can be made by detecting a feeding distance after the identifier PM of the base tape 101 is detected by a predetermined known method at Step S120 (by counting the number of pulses output by the feeding motor driving circuit 121 driving the feeding motor 119, which is a pulse motor, and the like). The determination is not satisfied till the tag label tape 109 with print is arrived at the front half-cut position and this procedure is repeated, and if arrived, the determination is satisfied, and the routine goes to the subsequent Step S135.

At Step S135, a control signal is output to the feeding motor driving circuit 121 and the tape discharge motor driving circuit 123 through the input/output interface 113 so as to stop driving of the feeding motor 119 and the tape discharge motor 65 and to stop rotation of the tape feeding roller 27, the ribbon take-up roller 106, and the driving roller 51. As a result, while the tag label tape 109 with print fed out of the cartridge 7 is moved in the discharge direction, in a state where the half cutter 34 of the half-cut mechanism 35 is opposed to the front half-cut line HC1 set at Step S105, feeding-out of the base tape 101 from the first roll 102, feeding-out of the cover film 103 from the second roll 104, and feeding of the tag label tape 109 with print are stopped. At this time, a control signal is also output to the print-head driving circuit 120 through the input/output interface 113 so as to stop electricity to the print head 23 and to stop the printing of the label print R (printing interrupted).

After that, at Step S140, a control signal is output to the half-cutter motor driving circuit 128 through the input/output interface 113 so as to drive the half-cutter motor 129, to rotate the half cutter 34, and to carry out the front half-cut processing of cutting off the cover film 103, the adhesive layer 101a, the base film 101b, and the adhesive layer 101c of the tag label tape 109 with print so as to form the front half-cut line HC1.

Then, the routine goes to Step S145, where the tape feeding roller 27, the ribbon take-up roller 106, and the driving roller 51 are rotated and driven similarly to Step S115 so as to resume the feeding of the tag label tape 109 with print, and the printing of the label print R is resumed by electrifying the print head 23 similarly to Step S125.

After that, the routine goes to Step S200, where tag access processing is carried out. That is, if the feeding has been done to a communication position of the RFID circuit element To for label production (position where the RFID circuit element To for label production is opposed to the first antenna LC1), the feeding and printing are stopped and information transmission/reception is carried out, and then, the feeding and printing are resumed so as to complete the print, and the feeding is further continued and stopped at the rear half-cut position, where the rear half-cut line HC2 is formed (See FIG. 14, which will be described later).

When Step S200 is finished as above, the routine goes to Step S155 (at this time, at Step S200, the feeding of the tag label tape 109 with print has been resumed). At Step S155, it is determined if the tag label tape 109 with print has been fed to the above-mentioned full-cut position or not (in other words, if the tag label tape 109 with print has reached the position where the movable blade 41 of the cutting mechanism 15 is opposed to the full-cut position set at Step S105 or not). The determination at this time may be also made by detecting the feeding distance after the identifier PM of the base tape 101 is detected at Step S120 by a predetermined known method, for example, similarly to the above (by counting the number of pulses output by the feeding motor driving circuit 121 driving the feeding motor 119, which is a pulse motor and the like). The determination is not satisfied till the tag label tape 109 with print is arrived at the full-cut position and this procedure is repeated, and if arrived, the determination is satisfied and the routine goes to the subsequent Step S160.

At Step S160, similarly to Step S135, the rotation of the tape feeding roller 27, the ribbon take-up roller 106, and the driving roller 51 is stopped, and the feeding of the tag label tape 109 with print is stopped. As a result, the feeding-out of the base tape 101 from the first roll 102, the feeding-out of the cover film 103 from the second roll 104, and the feeding of the tag label tape 109 with print are stopped in a state where the movable blade 41 of the cutting mechanism 15 is opposed to the full-cut position set at Step S105.

After that, a control signal is output to the cutter motor driving circuit 122 at Step S165 so as to drive the cutter motor 43, to rotate the movable blade 41 of the cutting mechanism 15, and to carry out the full cut processing of cutting (separating) all the cover film 103, the adhesive layer 101a, the base film 101b, the adhesive layer 101c, and the separation sheet 101d of the tag label tape 109 with print so as to form the cutting line. The label-shaped RFID label T separated by the cutting mechanism 15 from the tag label tape 109 with print and in which the RFID tag information in the RFID circuit element To for label production is read out and desired printing corresponding thereto is performed is produced.

After that, the routine goes to Step S170, where a control signal is output to the tape discharge motor driving circuit 123 through the input/output interface 113 so as to resume the driving of the tape discharge motor 65 and to rotate the driving roller 51. As a result, the feeding by the driving roller 51 is resumed, the RFID label T produced in the label shape at Step S165 is fed toward the label carry-out exit 11 and discharged through the label carry-out exit 11 to outside the apparatus. Then, at Step S175, the communication processing mode flag Fw is set to zero, and this flow is finished.

FIG. 14 is a flowchart illustrating a detailed procedure of the above-mentioned Step S200.

First, at Step S230, it is determined if the communication processing mode flag Fw=1 or not. The determination is not satisfied till it becomes Fw=1 (at Step S340 in the above-mentioned FIG. 11), and if it is Fw=1, the determination is satisfied, and the routine goes to the subsequent Step S235.

At Step S235, similarly to Step S135, the rotation of the tape feeding roller 27, the ribbon take-up roller 106, and the driving roller 51 is stopped, and the feeding of the tag label tape 109 with print is stopped in a state where the first antenna LC1 is substantially opposed to the RFID circuit element To for label production. Also, electricity to the print head 23 is stopped, and the printing of the label print R is stopped (interrupted).

At Step S400, (if it is Fw=1 at Step S340 as mentioned above, the first antenna LC1 has been connected with the antenna sharing device 240 at Step S320) the information transmission/reception processing is carried out (for details, see FIG. 15, which will be described later) in which information transmission/reception is carried out between the first antenna LC1 and the RFID circuit element To for label production via radio communication, and the information created at Step S105 in FIG. 13 is written in the IC circuit part 151 (or the information stored in advance in the IC circuit part 151 is read out) of the RFID circuit element To for label production.

After that, the routine goes to Step S240, and similarly to Step S145 in FIG. 13, the tape feeding roller 27, the ribbon take-up roller 106, and the driving roller 51 are rotated and driven, the feeding of the tag label tape 109 with print is resumed, the print head 23 is electrified, and the printing of the label print R is resumed.

At this time, if an electricity stopped time of the print head 23 at Step S235 and after becomes longer than a predetermined time due to too many communication retry times (retry number of times) at Step S400 and the like, there is a possibility that a temperature of the print head 23 is lowered. Therefore, in order to handle this, electricity to the print head 23 (energy amount per unit time) may be made larger than usual at resumption of the printing at Step S240.

After that, the routine goes to Step S250, where it is determined if the tag label tape 109 with print has been fed to the above-mentioned printing end position (calculated at Step S105 in FIG. 13) or not. The determination at this time can be also made by detecting the feeding distance after the identifier PM of the base tape 101 is detected at Step S120 by the predetermined known method similarly to the above, for example. The determination is not satisfied till the tag label tape 109 with print is arrived at the printing end position and this procedure is repeated, and if arrived, the determination is satisfied and the routine goes to the subsequent Step S260.

At Step S260, similarly to Step S135 in FIG. 13, electricity to the print head 23 is stopped, and the printing of the label print R is stopped. As a result, the printing of the label print R on the print region S is completed.

After that, the routine goes to Step S500, where the feeding to the predetermined rear half-cut position is carried out and then, the rear half-cut processing of forming the rear half-cut line HC2 by the half cutter 34 is carried out. Then, this routine is finished.

FIG. 15 is a flowchart illustrating a detailed procedure of the above-mentioned Step S400. In this example, in the above-mentioned information writing and information reading, the information writing will be described as an example.

First, at Step S405 shown in FIG. 15, a control signal is output to the above-mentioned transmitting circuit 306 through the input/output interface 113, and a carrier wave applied with predetermined modulation is transmitted to the RFID circuit element To for label production as a writing target through the first antenna LC1 as an "Erase" signal to initialize information stored in the memory part 157 of the RFID circuit element To for label production.

Subsequently at Step S410, a control signal is transmitted to the transmitting circuit 306 through the input/output interface 113, a carrier wave applied with predetermined modulation is transmitted to the RFID circuit element To for label production as a writing target through the first antenna LC1 as a "Verify" signal to confirm the contents of the memory part 157, and a reply is prompted.

After that, at Step S415, a reply signal transmitted from the RFID circuit To for label production as a writing target in response to the "Verify" signal is received through the first antenna LC1 and taken in through the receiving circuit 307 and the input/output interface 113.
response to the "Verify" signal is received through the first Subsequently, at Step S420, on the basis of the received reply signal, the information in the memory part 157 of the RFID circuit element To for label production is confirmed, and it is determined if the memory part 157 has been normally initialized or not.

If the determination is not satisfied, the routine goes on to Step S425, where one is added to M, and moreover, at Step S430, it is determined if M=5 or not. In the case of M≦4, the determination is not satisfied and the routine returns to Step S405 and the same procedure is repeated. In the case of M=5, the routine goes on to Step S435, where an error display signal is output to the PC 118 through the input/output interface 113 so that corresponding writing failure (error) display is made and moreover, at Step S437, the above-mentioned flag F=1 is set and this routine is finished. In this way, even if initialization is not successful, retry is made up to 5 times.

If the determination at Step S420 is satisfied, the routine goes on to Step S440, where a control signal is output to the transmitting circuit 306, and a carrier wave applied with predetermined modulation is transmitted to the RFID circuit element To for label production as a writing target through the first antenna LC1 as a "Program" signal to write desired data in the memory part 157, and the information is written.

After that, at Step S445, a control signal is output to the transmitting circuit 306, a carrier wave applied with predetermined modulation as the "Verify" signal is transmitted to the RFID circuit element To for label production as a writing target through the first antenna LC1, and a reply is prompted. After that, at Step S450, a reply signal transmitted from the RFID circuit To for label production as a writing target in response to the "Verify" signal is received through the first antenna LC1 and taken in through the receiving circuit 307.

Subsequently, at Step S455, on the basis of the received reply signal, the information stored in the memory part 157 of the RFID circuit element To for label production is verified, and it is determined if the above-mentioned transmitted predetermined information is normally stored in the memory part 157 or not using a known error detection code (CRC code: Cyclic Redundancy Check or the like).

If the determination is not satisfied, the routine goes to Step S460, where one is added to N, and it is further determined at Step S465 if it is N=5 or not. In the case of N≦4, the determination is not satisfied and the routine returns to Step S440, where the similar procedure is repeated. In the case of N=5, the routine goes to the above-mentioned Step S435, where a corresponding writing failure (error) display is similarly made on the PC 118, the above-mentioned flag F=1 is set at Step S437, and this routine is finished. In this way, even if information writing is not successful, retry is made up to 5 times.

If the determination at Step S455 is satisfied, the routine goes to Step S470, where a control signal is output to the transmitting circuit 306, a carrier wave applied with predetermined modulation as a "Lock" is transmitted to the RFID circuit element To for label production as a writing target through the first antenna LC1, and new writing of information in the RFID circuit element To for label production as a writing target is prohibited. As a result, writing of the RFID tag information in the RFID circuit element To for label production as a writing target is completed.

After that, the routine goes to Step S480, and combination of the information written in the RFID circuit element To for label production at Step S440 and the print information of the label print R already printed on the print region S by the print head 23 in response to that is output through the input/output interface 113 and the communication line NW and stored in the information server IS and the route server RS. This stored data is stored/held in a database of each of the servers IS, RS, for example, so that it can be referred to by the PC 118 as necessary. As a result, this routine is finished.

In the above flow, when the "Erase", "Verify", "Program" signals and the like are output from the first antenna LC1, the transmission output may be made smaller than the case of the scan processing at Step S300A.

Also, the case in which the RFID tag information is transmitted to the RFID circuit element To for label production and the writing is carried out in the IC circuit part 151 so as to produce the RFID label T is described, but not limited to that. That is, it may be so configured that the RFID tag information is read out from the read-only RFID circuit element To for label production in which predetermined RFID tag information is unrewritably stored and held in advance, while the corresponding print is performed so as to produce the RFID label T.

In the above, the procedure at Step S320 and Step S345 in FIG. 11 executed by the control circuit 110 constitutes an antenna switching control portion that makes switching so that an inquiry signal is selectively transmitted to the RFID circuit element for label production or the RFID circuit element for information acquisition through the antenna for label production or the antenna for information acquisition described in each claim.

Also, Step S360 to Step S366 in FIG. 10 executed by the control circuit 110 corresponds to the information acquisition processing mode that carries out the information acquisition processing of the RFID circuit element for information acquisition, and Step S240 to S500 in FIG. 14 corresponds to the communication processing mode with the RFID circuit element for label production. Further, Step S360 to Step S366 in FIG. 10 and Step S240 to S500 in FIG. 14 constitute a mode processing portion that carries out processing corresponding to the communication processing mode or the information acquisition processing mode according to receiving of a response signal to the inquiry signal from the RFID circuit element for label production or the RFID circuit element for information acquisition through the antenna for label production or the antenna for information acquisition.

In this embodiment described in the above, when the communication processing mode is executed, the information is written in the RFID circuit element To for label production provided at the tag label tape 109 with print through the first antenna LC1, and moreover, the tag label tape 109 with print is cut off so as to produce the RFID label T with print. On the other hand, when the information acquisition processing mode is executed, the information stored in the RFID circuit element To for information acquisition located outside the housing 200 is read out through the second antenna LC2 and gotten. As mentioned above, since the two antennas LC1, LC2 are used separately in the single apparatus 1 for communicating with a RFID tag, and both the label production and information reading (acquisition) can be carried out while the transmitting circuit 306 and the receiving circuit 307 and the like, which are communication circuit portions, are shared, the equipment configuration can be simplified and cost burden on a user can be reduced as compared with the case of separately preparing an apparatus for producing a label and an apparatus for communicating with a tag.

At this time, at Step S320 and Step S345 in FIG. 11, the first antenna LC1 and the second antenna LC2 are cyclically switched so that the inquiry signals (interrogation signals) to the antennas LC1, LC2 are alternately and selectively transmitted (Step S325 and Step S350), and which of the communication processing mode and the information acquisition processing mode is to be executed is determined according to the receiving of the response signal to the inquiry signal (Step S330 and Step S355). As a result, since there is no more need for the operator to select and operate which of the label production and the information reading and the mode is automatically switched and determined, time and labor of the operator can be reduced and rapid processing is realized, and since there is no wrong mode selection by the operator, convenience can be improved.

Particularly in this embodiment, at Step S335 in FIG. 11, if the signal strength of the response signal from the RFID circuit element To for label production received through the first antenna LC1 is not less than a threshold value, Fw=1 is set at Step S340 so that the processing corresponding to the communication processing mode is executed. As a result, the information writing is carried out when the RFID circuit element To for label production becomes sufficiently close to the first antenna LC1. As a result, assuredness and reliability of the information transmission/reception via radio communication can be improved.

Particularly in this embodiment, if the signal strength of the response signal from the RFID circuit element To for label production received through the first antenna LC1 is less than the threshold value (if the determination at Step S335 is not satisfied), when the routine returns to the state in which the first antenna LC1 and the second antenna LC2 are alternately switched, the routine goes to Step S345 so that resumption is made from the transmission of the inquiry signal to the RFID circuit element To for information acquisition through the second antenna LC2. As a result, a blank period of receiving determination of the reply signal from the RFID circuit element To for information acquisition through the second antenna LC2 can be reduced.

Also, particularly in this embodiment, even if the reply signal from the RFID circuit element To for information acquisition is received through the second antenna LC2, at Step S360, when the tag ID in the reply signal from the RFID circuit element To for information acquisition is the same as the one already gotten, execution of the processing corresponding to the information acquisition processing mode is avoided and the routine returns to the receiving standby state of the reply signal. As a result, wasteful processing can be omitted, and the processing can be expedited.

The present invention is not limited to the above embodiments but is capable of various variations within a range not departing from its gist and technical idea. The variations will be described below in order.

(1) When a feeding speed of the tag label tape is changed:

This variation is an example in which when the response signal from the RFID circuit element To for information acquisition is received, speed reduction processing (including deceleration and stop) of the feeding speed of the tag label tape 109 is executed.

FIG. 16 is a flowchart illustrating a scan processing procedure S300A' executed instead of Step S300A in FIG. 10B in the control procedure executed by the control circuit 110 in this variation and corresponds to the above-mentioned FIG. 11. The same reference numerals are given to the procedures similar to those in FIG. 11, and the description will be omitted as appropriate.

In FIG. 16, first, at Step S305', the communication processing mode flag Fw for writing information in the RFID circuit element To for label production provided at the tag label tape 109 with print and a speed change flag $F_L$ for changing the feeding speed of the tag label tape 109 are initialized to 0.

Step S310 to Step S355 are similar to those in the above-mentioned FIG. 11, and if the reply signal from the RFID circuit element To for information acquisition is received through the second antenna LC2 at Step S355, the routine goes to Step S375, where the speed change flag $F_L$ is set to one. Then, the routine goes to the above-mentioned Step S356.

FIG. 17 is a flowchart illustrating a tag label production processing procedure S300B' executed instead of Step S300B in FIG. 10 in the control procedure executed by the control circuit 110 in this variation and corresponds to the above-mentioned FIG. 13. The same reference numerals are given to the procedures similar to those in FIG. 13, and the description will be omitted as appropriate.

Step S105 to Step S120 are similar to those in the above-mentioned FIG. 13, and if it is determined at Step S120 that the identifier PM of the base tape 101 has not been detected, the routine goes to Step S121, where it is determined if the speed change flag $F_L=1$ or not. If it is not $F_L=1$, the determination is not satisfied, and at the subsequent Step S123, the rotating speed of the tape feeding roller 27, the ribbon take-up roller 106, and the driving roller 51 is operated as usual, and the feeding of the tag label tape 109 with print is carried out at a usual speed (if deceleration or stop has been executed prior to that, it is cancelled and returned to the usual speed). If it becomes $F_L=1$, the determination is satisfied, and the routine goes to the subsequent Step S122, where control is made so that the rotating speed of the tape feeding roller 27, the ribbon take-up roller 106, and the driving roller 51 is lowered, and the feeding of the tag label tape 109 with print is decelerated (or may be stopped: speed reduction processing portion). Then, the routine returns to Step S120, and the similar procedure is executed.

Step S125 to Step S130 are similar to those in the above-mentioned FIG. 13, and if it is determined that the tag label tape 109 with print has not reached the position where the half cutter 34 of the half cut mechanism 35 is opposed to the above-mentioned front half-cut line HC1 yet, the routine goes to Step 131, where it is determined if the speed change flag $F_L=1$ or not. If it is not $F_L=1$, the determination is not satisfied, and at the subsequent Step S133, similarly to the above, the rotating speed of the tape feeding roller 27, the ribbon take-up roller 106, and the driving roller 51 is operated as usual, and the feeding of the tag label tape 109 with print is carried out at a usual speed (if deceleration or stop has been executed prior to that, it is cancelled and returned to the usual speed). If it becomes $F_L=1$, the determination is satisfied, and the routine goes to the subsequent Step S132. At Step S132, similarly to Step S122, control is made so that the rotating speed of the tape feeding roller 27, the ribbon take-up roller 106, and the driving roller 51 is lowered, and the feeding of the tag label tape 109 with print is decelerated (or may be stopped: speed reduction processing portion). Then, the routine returns to Step S130, and the similar procedure is executed.

Step S135 to Step S145 are similar to those in the above-mentioned FIG. 13.

After that, the tag access processing is executed at Step S200' (See FIG. 18, which will be described later), and moreover, Step S155 to Step S175 similar to those in the above-mentioned FIG. 13 are executed.

FIG. 18 is a flowchart illustrating a detailed procedure of the above-mentioned Step S200' and corresponds to the above-mentioned FIG. 14.

In FIG. 18, Step S230 is similar to that in the above-mentioned FIG. 14. After Step S230, the routine goes to Step S235' and similarly to Step S122 and Step S132 in FIG. 17, control is made so that the rotating speed of the tape feeding roller 27, the ribbon take-up roller 106, and the driving roller 51 is lowered, and the feeding of the tag label tape 109 with print is decelerated (or may be stopped).

Subsequently, after the information transmission/reception processing at Step S400 is executed similarly to FIG. 14, the routine goes to Step S240'. At Step S240', similarly to Step S123 and Step S133 in FIG. 17, the rotating speed of the tape feeding roller 27, the ribbon take-up roller 106, and the driving roller 51, which has been brought into the decelerated (or stopped) state once at Step S122, Step S132 or Step S235' is operated as usual, and the feeding of the tag label tape 109 with print is recovered to the usual speed (deceleration or stop is cancelled; speed-up processing portion). The speed may be higher than the original speed.

After that, the procedure at Step S250 to Step S500 is the same as in the above-mentioned FIG. 14.

In this variation described as above, in addition to the effect similar to that in the embodiment, if the reply signal from the RFID circuit element To for information acquisition communication is received through the antenna LC2 for information acquisition communication, the determination at Step S121, Step S131 is satisfied, and the feeding speed of the tag label tape 109 with print is lowered (or brought to zero. The same applies to the following) at Step S122, Step S132, respectively. As a result, entry of the RFID circuit element To for label production into the communication range in the vicinity of the first antenna LC1 is delayed, and passage from the communication range faster than necessary is prevented. As a result, too, the assuredness and reliability of the information communication can be improved.

Also, if the deceleration of the feeding of the tag label tape 109 with print is no longer needed, since the feeding speed of the tag label tape 109 with print is accelerated (or returned to the original speed again and the like) at Step S240', rapid processing can be realized.

(2) Others:

In the above, the second antenna LC2 is provided on the side face side of the apparatus main body 2, and information is read out from the RFID circuit element To for information acquisition located outside the apparatus main body 2 (housing 200) on the side face side of the apparatus main body 2, but not limited to that. That is, it may be so configured that the second antenna LC2 is provided on the front face side or the upper face side of the apparatus main body 2, and information is read out from the RFID circuit element To for information acquisition located outside the apparatus main body 2 (housing 200) on the front face side or the upper face side of the apparatus main body 2.

Also, in the above, the RFID tag information is transmitted to the RFID circuit element To for label production, and the writing is made in the IC circuit part 151 so as to produce the RFID label T, but not limited to that. That is, as having been already described, the present invention can be also applied to a case in which the RFID tag information is read out from the read-only RFID circuit element To for label production in which predetermined RFID tag information is unrewritablly stored and held in advance, while the corresponding printing is performed so as to produce the RFID label T, and in this case, too, the effect similar to the above can be obtained.

Also, in the above, the printing is performed on the cover film 103 separate from the base tape 101 as the tag medium provided with the RFID circuit element To and they are bonded together, but not limited to that, but the present invention may be applied to such a method (non-bonding type) that a tag tape (tag medium) provided with a print-receiving layer (thermal layer made of a thermal material that develops color by heat and can form printing, a transferred layer constituted by a transferred material that can form printing by heat transfer from an ink ribbon or an image-receiving layer constituted by an image-receiving material that can form printing by applying ink and the like, for example) is used for performing printing on the print-receiving layer. In this case, constitution of a receiver 38 and the half cutter 34 in the half-cut unit 35 is different from that of this embodiment. That is, the receiver is arranged on the side of the half cutter 34 in FIG. 4, and the half cutter is arranged on the side of the receiver 38.

Also, in the above, the case in which the tag label tape 109 with print for which the print and access to the RFID circuit element To for label production (for reading or writing) have been finished is cut off by the cutting mechanism 15 so as to produce the RFID label T is described as an example, but not limited to that. That is, if label mounts (so-called die-cut labels) separated in advance to a predetermined size corresponding to the label are sequentially arranged on the tape fed out of the roll, the RFID label T may be produced by peeling off only the label mount (on which the accessed RFID circuit element To for label production is provided and the corresponding print has been applied) from the tape after the tape is discharged from the label carry-out exit 11 without cutting it by the cutting mechanism 15, and the present invention can also be applied to such a case.

Moreover, in the above, the case in which the tag label tape 109 with print is used so as to produce the RFID label T with print is described, but not limited to that, but the present invention may be also applied to production of the RFID label T without print.

The "Scroll ID" signal, the "Erase" signal, the "Verify" signal, the "Program" signal and the like used in the above shall comply with the specification formulated by EPC global. The EPC global is a non-profit corporation jointly established by International EAN Association, which is an international organization of distribution codes, and UCC (Uniformed Code Council), which is an U.S. distribution code organization. Signals complying with other standards will do as long as they serve the same functions.

Other than those mentioned above, methods of the embodiments and each variation may be combined as appropriate for use.

Though not specifically exemplified, the present invention should be put into practice with various changes made in a range not departing from its gist.

What is claimed is:

1. An apparatus for communicating with a radio frequency identification (RFID) tag comprising:
a housing constituting an outer shell of an apparatus main body; a feeding device configured to feed a tag medium, provided in said housing;
an antenna for label production that can transmit or receive information to a RFID circuit element for label production provided at said tag medium, provided with an IC circuit part storing information and a tag antenna for information transmission or reception;

an antenna for information acquisition that can transmit or receive information to a RFID circuit element for information acquisition located outside said housing, provided with an IC circuit part storing information and a tag antenna for information transmission/reception;

an antenna switching control portion configured to switch so as to selectively transmit an inquiry signal to said RFID circuit element for label production through said antenna for label production or said RFID circuit element for information acquisition through said antenna for information acquisition; and a mode processing portion configured to carry out processing corresponding to a communication processing mode with said RFID circuit element for label production or an information acquisition processing mode for information acquisition processing of said RFID circuit element for information acquisition, in response to receiving of a response signal to said inquiry signal from said RFID circuit element for label production through said antenna for label production or from said RFID circuit element for information acquisition through said antenna for information acquisition;

wherein said antenna switching control portion continues to execute said switching between the transmission of the inquiry signal to said RFID circuit element for label production and the transmission of the inquiry signal to said RFID circuit element for information acquisition, in turn repeatedly for each predetermined cycle, while the response signal from said RFID circuit element for label production nor the response signal from said RFID circuit element for information acquisition is not received.

2. The apparatus for communicating with a RFID tag according to claim 1, wherein:
said antenna switching control portion executes said switching with a predetermined cycle so that transmission of said inquiry signal to said RFID circuit element for label production through said antenna for label production and transmission of said inquiry signal to said RFID circuit element for information acquisition through said antenna for information acquisition is carried out alternately.

3. The apparatus for communicating with a RFID tag according to claim 2, wherein:
said mode processing portion executes:
processing corresponding to said communication processing mode in the case that said response signal is received from said RFID circuit element for label production through said antenna for label production in response to the transmission of said inquiry signal; and
processing corresponding to said information acquisition processing mode in the case that said response signal is received from said RFID circuit element for information acquisition through said antenna for information acquisition in response to the transmission of said inquiry signal.

4. The apparatus for communicating with a RFID tag according to claim 3, further comprising a signal strength detecting device configured to detect signal strength of said response signal, wherein:
said mode processing portion executes processing corresponding to said communication processing mode in the case that signal strength of said response signal from said RFID circuit element for label production received through said antenna for label production in response to the transmission of said inquiry signal is not less than a predetermined threshold value.

5. The apparatus for communicating with a RFID tag according to claim 4, wherein:
said antenna switching control portion carries out said switching so that, in the case that the signal strength of said response signal from said RFID circuit element for label production through said antenna for label production is less than a predetermined threshold value, said transmission of inquiry signal executed alternately after that is resumed from the transmission to said RFID circuit element for information acquisition through said antenna for information acquisition.

6. The apparatus for communicating with a RFID tag according to claim 3, wherein:
when the response signal from said RFID circuit element for information acquisition is received through said antenna for information acquisition in response to the transmission of said inquiry signal and the tag identification information of the RFID circuit element for information acquisition gotten from the response signal is the one already gotten in said information acquisition processing mode, then said mode processing portion does not process in accordance with said information acquisition processing mode but returns to a standby state to receive said response signal through said antenna for label production or through said antenna for information acquisition.

7. The apparatus for communicating with a RFID tag according to claims 3, wherein:
said mode processing portion includes an information output portion configured to output to an operation terminal information gotten from said RFID circuit element for information acquisition in said information acquisition processing mode in response to the transmission of said inquiry signal.

8. The apparatus for communicating with a RFID tag according to claim 3, further comprising a speed reduction processing portion configured to carry out speed reduction processing of a feeding speed of said tag medium by said feeding device in the case that said response signal from said RFID circuit element for information acquisition is received through said antenna for information acquisition.

9. The apparatus for communicating with a RFID tag according to claim 8, wherein:
said mode processing portion includes a speed-up processing portion configured to carry out speed-up processing of the feeding speed of said feeding device given the speed reduction processing by said speed reduction processing portion in said communication processing mode.

10. The apparatus for communicating with a RFID tag according to claim 1, further comprising an information input portion configured to input information to be written in said IC circuit part of said RFID circuit element for label production from the operation terminal in said communication processing mode of said mode processing portion.

11. The apparatus for communicating with a RFID tag according to claim 1, further comprising a printing device configured to perform printing on said tag medium or a print-receiving medium to be bonded to the tag medium according to contents of said information transmission/reception with said RFID circuit element for label production through said antenna for label production.

* * * * *